United States Patent
McMillen et al.

(10) Patent No.: US 7,137,664 B2
(45) Date of Patent: *Nov. 21, 2006

(54) AUTOMATICALLY ACTUATING ERGONOMIC SUPPORT SYSTEM FOR A FOLD DOWN SEAT

(75) Inventors: Robert J. McMillen, Tecumseh (CA); Robert Renato Colja, Windsor (CA); Lukic Zeljko, Windsor (CA)

(73) Assignee: L&P Property Management Company, South Gate, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 10/663,194

(22) Filed: Sep. 16, 2003

(65) Prior Publication Data

US 2004/0140705 A1 Jul. 22, 2004

Related U.S. Application Data

(63) Continuation-in-part of application No. 10/349,525, filed on Jan. 22, 2003, now Pat. No. 6,905,170, and a continuation-in-part of application No. 10/361,475, filed on Feb. 10, 2003.

(51) Int. Cl.
*A47C 3/027* (2006.01)
(52) U.S. Cl. .............................. 297/284.4; 297/284.1; 297/284.8
(58) Field of Classification Search ............. 297/284.1, 297/284.2, 284.4, 284.8, 284.9, 391, 403, 297/408, 409
See application file for complete search history.

(56) References Cited

U.S. PATENT DOCUMENTS

| | | | |
|---|---|---|---|
| 1,182,854 A | 5/1916 | Poler | |
| 1,203,293 A | 10/1916 | Wilkinson | |
| 2,274,176 A | 2/1942 | Widman | |
| 2,756,809 A | 7/1956 | Endresen | 155/182 |
| 2,833,339 A | 5/1958 | Liljengren | |
| 2,843,195 A | 7/1958 | Barvaeus | 155/182 |
| 2,855,984 A | 10/1958 | Majorana et al. | |
| 2,942,651 A | 6/1960 | Binding | 155/131 |

(Continued)

FOREIGN PATENT DOCUMENTS

AT 401 497 9/1996

(Continued)

*Primary Examiner*—Laurie K. Cranmer
(74) *Attorney, Agent, or Firm*—Husch & Eppenberger LLC; Grant D. Kang

(57) ABSTRACT

A fold down seat back or seat bottom has at least one ergonomic support device in it. A traction cable is operatively engaged at one end with the ergonomic support device to actuate it. The fold down seat back includes a rotating cable tension unit and a fixed torsion bar. The rotating member moves relative to the fixed member when said fold down seat back is folded up. The traction cable is comprised of a sleeve having a first end and a second end and a wire having a first end and a second end. The wire is disposed to slide axially through the sleeve. The first sleeve end is attached to the rotating cable tension unit. The wire end is attached to the fixed torsion bar. The wire end may be attached to the torsion rod with a pulley. These attachments of the sleeve end and the wire end cause the wire to be drawn axially through the sleeve when the seat back is folded up, extending or rotating an ergonomic support, and cause the wire to be relaxed when the seat back is folded down, flattening the ergonomic support. The ergonomic device may be a bolster, a wire array, a head rest, an arching pressure surface or a scissors lumbar support.

39 Claims, 18 Drawing Sheets

U.S. PATENT DOCUMENTS

| | | | |
|---|---|---|---|
| 3,121,585 A | 2/1964 | Krueger et al. | |
| 3,202,453 A | 8/1965 | Richards | |
| 3,241,879 A | 3/1966 | Castello et al. | |
| 3,246,924 A | 4/1966 | Krueger et al. | |
| 3,271,076 A | 9/1966 | Smith | |
| 3,273,877 A | 9/1966 | Geller et al. | |
| 3,363,941 A | 1/1968 | Wierwille | |
| 3,378,299 A | 4/1968 | Sandor | 297/284 |
| 3,416,839 A | 12/1968 | Flint | |
| 3,490,084 A | 1/1970 | Schuster | 5/351 |
| 3,492,768 A | 2/1970 | Schuster | 52/98 |
| 3,550,953 A | 12/1970 | Neale | |
| 3,695,688 A | 10/1972 | Wize | |
| 3,724,144 A | 4/1973 | Schuster | 52/108 |
| 3,762,769 A | 10/1973 | Poschl | 297/284 |
| 3,927,911 A | 12/1975 | Rosquist | |
| 3,967,852 A | 7/1976 | Eiselt et al. | |
| 3,983,640 A | 10/1976 | Cardullo et al. | |
| 3,992,059 A | 11/1976 | Kloepfer | |
| 4,105,245 A | 8/1978 | Simons et al. | |
| 4,136,577 A | 1/1979 | Borgersen | 74/479 |
| 4,153,293 A | 5/1979 | Sheldon | 297/284 |
| 4,155,592 A | 5/1979 | Tsuda et al. | |
| 4,156,544 A | 5/1979 | Swenson et al. | 297/284 |
| 4,182,533 A | 1/1980 | Arndt et al. | 297/284 |
| 4,190,286 A | 2/1980 | Bentley | |
| 4,295,681 A | 10/1981 | Gregory | 297/284 |
| 4,313,637 A | 2/1982 | Barley | 297/284 |
| 4,316,631 A | 2/1982 | Lenz et al. | 297/284 |
| 4,354,709 A | 10/1982 | Schuster | 297/284 |
| 4,368,916 A | 1/1983 | Blasin | |
| 4,390,210 A | 6/1983 | Wisniewski et al. | 297/452 |
| 4,428,611 A | 1/1984 | Widmer | |
| 4,449,751 A | 5/1984 | Murphy et al. | 297/284 |
| 4,452,485 A | 6/1984 | Schuster | 297/284 |
| 4,465,317 A | 8/1984 | Schwarz | 297/284 |
| 4,519,646 A | 5/1985 | Leitermann et al. | |
| 4,541,670 A | 9/1985 | Morgenstern et al. | 297/284 |
| 4,555,140 A | 11/1985 | Nemoto | 297/452 |
| 4,556,251 A | 12/1985 | Takagi | 297/284 |
| 4,564,235 A | 1/1986 | Hatsutta et al. | 297/284 |
| 4,565,406 A | 1/1986 | Suzuki | 297/284 |
| 4,576,410 A | 3/1986 | Hattori | 297/284 |
| 4,601,514 A | 7/1986 | Meiller | 297/284 |
| 4,602,819 A | 7/1986 | Morel | 297/460 |
| 4,616,874 A | 10/1986 | Pietsch et al. | |
| 4,619,481 A | 10/1986 | Grudzinskas | |
| 4,627,661 A | 12/1986 | Ronnhult et al. | 297/284 |
| 4,630,865 A | 12/1986 | Ahs | 297/284 |
| 4,632,454 A | 12/1986 | Naert | 297/284 |
| 4,634,083 A | 1/1987 | McKinnon | |
| 4,655,505 A | 4/1987 | Kasiwamura et al. | |
| 4,676,550 A | 6/1987 | Neve De Mevergnies | 297/353 |
| 4,679,848 A | 7/1987 | Spierings | 297/284 |
| 4,699,418 A | 10/1987 | Plavetich | |
| 4,707,027 A | 11/1987 | Horvath et al. | |
| 4,711,490 A | 12/1987 | Brand | |
| 4,730,871 A | 3/1988 | Sheldon | 297/230 |
| 4,768,830 A | 9/1988 | Musselwhite | |
| 4,826,249 A | 5/1989 | Bradbury | |
| 4,833,614 A | 5/1989 | Saitoh et al. | |
| 4,880,271 A | 11/1989 | Graves | 257/284 |
| 4,909,568 A | 3/1990 | Dal Monte | 292/284 |
| 4,915,448 A | 4/1990 | Morgenstern | 297/284 |
| 4,950,032 A | 8/1990 | Nagasaka | 297/284 |
| 4,957,102 A | 9/1990 | Tan et al. | 128/68 |
| 4,968,093 A | 11/1990 | Dal Monte | 297/284 |
| 4,976,104 A | 12/1990 | Morris et al. | |
| 5,005,904 A | 4/1991 | Clemens et al. | 297/284 |
| 5,022,709 A | 6/1991 | Marchino | 297/452 |
| 5,026,116 A | 6/1991 | Dal Monte | 297/284 |
| 5,050,930 A | 9/1991 | Schuster et al. | 257/284 |
| 5,076,643 A | 12/1991 | Colasanti et al. | 297/284 |
| 5,082,326 A | 1/1992 | Sekido et al. | |
| 5,088,790 A | 2/1992 | Wainwright et al. | 297/284 |
| 5,092,654 A | 3/1992 | Inaba et al. | |
| 5,120,111 A | 6/1992 | Cook | |
| 5,137,329 A | 8/1992 | Neale | 297/284 |
| 5,174,526 A | 12/1992 | Kanigowski | 244/122 |
| 5,195,795 A | 3/1993 | Cannera et al. | |
| 5,197,780 A | 3/1993 | Coughlin | 297/284.7 |
| 5,215,350 A | 6/1993 | Kato | 297/284.4 |
| 5,217,278 A | 6/1993 | Harrison et al. | 297/284.7 |
| 5,269,581 A | 12/1993 | Okagaki et al. | |
| 5,286,087 A | 2/1994 | Elton | 297/284.7 |
| 5,292,175 A | 3/1994 | Artz | |
| 5,292,176 A | 3/1994 | Artz | |
| 5,299,851 A | 4/1994 | Lin | 297/284.5 |
| 5,316,371 A | 5/1994 | Bishai | |
| 5,335,965 A | 8/1994 | Sessini | 297/284.4 |
| 5,368,355 A | 11/1994 | Hayden et al. | |
| 5,385,389 A | 1/1995 | Bishai | |
| 5,385,531 A | 1/1995 | Jover | 601/99 |
| 5,397,164 A | 3/1995 | Schuster | 297/284.1 |
| 5,397,167 A | 3/1995 | Fourrey et al. | |
| 5,423,593 A | 6/1995 | Nagashima | 297/284.5 |
| 5,449,219 A | 9/1995 | Hay et al. | 297/284.4 |
| 5,452,868 A | 9/1995 | Kanigowski | 244/122 R |
| 5,474,358 A | 12/1995 | Maeyaert | 297/284.7 |
| 5,482,346 A | 1/1996 | Lesourd | |
| 5,498,063 A | 3/1996 | Schuster et al. | 297/284.1 |
| 5,518,294 A | 5/1996 | Ligon, Sr. et al. | 297/284.4 |
| 5,529,377 A | 6/1996 | Miller | |
| 5,553,917 A | 9/1996 | Adat et al. | 297/230.14 |
| 5,562,324 A | 10/1996 | Massara et al. | 297/284.6 |
| 5,567,010 A | 10/1996 | Sparks | 297/284.4 |
| 5,567,011 A | 10/1996 | Sessini | 297/284.4 |
| 5,570,931 A | 11/1996 | Kargilis et al. | |
| 5,588,703 A | 12/1996 | Itou | 297/284.4 |
| 5,588,707 A | 12/1996 | Bolsworth et al. | |
| 5,609,394 A | 3/1997 | Ligon, Sr. et al. | 297/284.4 |
| 5,626,390 A | 5/1997 | Schuster et al. | 297/284.1 |
| 5,638,722 A | 6/1997 | Klingler | 74/502.4 |
| 5,651,583 A | 7/1997 | Klingler et al. | 297/284.4 |
| 5,651,584 A | 7/1997 | Chenot et al. | 297/284.4 |
| 5,660,438 A | 8/1997 | Tedesco | |
| 5,704,687 A | 1/1998 | Klingler | 297/284.4 |
| 5,718,476 A | 2/1998 | De Pascal et al. | 297/284.4 |
| 5,730,495 A | 3/1998 | Tuman, II | |
| 5,758,925 A | 6/1998 | Schrewe et al. | 297/284.6 |
| 5,762,397 A | 6/1998 | Venuto et al. | 297/284.4 |
| 5,769,491 A | 6/1998 | Schwarzbich | 297/284.4 |
| 5,772,281 A | 6/1998 | Massara | 297/284.4 |
| 5,775,773 A | 7/1998 | Schuster et al. | 297/284.1 |
| 5,791,733 A | 8/1998 | van Hekken et al. | 297/284.4 |
| 5,816,653 A | 10/1998 | Benson | 297/284.4 |
| 5,823,620 A | 10/1998 | Le Caz | 297/284.4 |
| 5,857,743 A | 1/1999 | Ligon, Sr. et al. | 297/284.9 |
| 5,868,466 A | 2/1999 | Massara et al. | 297/284.6 |
| 5,884,968 A | 3/1999 | Massara | 297/216.12 |
| 5,897,168 A | 4/1999 | Bartelt et al. | 297/452.18 |
| 5,911,477 A | 6/1999 | Mundell et al. | 297/284.4 |
| 5,913,569 A | 6/1999 | Klingler | 297/284.4 |
| 5,934,752 A | 8/1999 | Klingler | 297/284.4 |
| 5,941,602 A | 8/1999 | Sturt et al. | |
| 5,967,608 A | 10/1999 | Van Sickle | |
| 5,975,632 A | 11/1999 | Ginat | 297/284.4 |
| 5,984,407 A | 11/1999 | Ligon, Sr. et al. | 297/284.4 |
| 5,988,745 A | 11/1999 | Deceuninck | 297/284.4 |
| 6,003,941 A | 12/1999 | Schuster, Sr. et al. | 297/284.1 |
| 6,007,151 A | 12/1999 | Benson | 297/284.4 |
| 6,030,041 A | 2/2000 | Hsiao | 297/284.4 |
| 6,036,265 A | 3/2000 | Cosentino | 297/284.4 |
| 6,045,185 A | 4/2000 | Ligon, Sr. et al. | 297/284.4 |

| | | | | | | |
|---|---|---|---|---|---|---|
| 6,050,641 A | 4/2000 | Benson ............... 297/284.4 | DE | 206 4419 | 7/1972 |
| 6,079,783 A | 6/2000 | Schuster, Sr. et al. ... 297/284.4 | DE | 29 47 472 | 8/1980 |
| 6,092,871 A | 7/2000 | Beaulieu ............... 297/284.4 | DE | 42 20 995 A1 | 1/1994 |
| 6,152,531 A | 11/2000 | Deceuninck ........... 297/284.4 | DE | 19750116 A1 | 5/1999 |
| 6,152,532 A | 11/2000 | Cosentino ............. 297/284.4 | DE | 10005215 C1 | 9/2001 |
| 6,158,300 A | 12/2000 | Klingler ............... 74/526 | EP | 0 006 840 B1 | 2/1982 |
| 6,174,017 B1 | 1/2001 | Salani et al. | EP | 0 169 293 B1 | 10/1988 |
| 6,199,951 B1 | 3/2001 | Zeile et al. | EP | 0 322 535 A1 | 7/1989 |
| 6,227,617 B1 | 5/2001 | Von Möller ........... 297/284.4 | EP | 0 485 483 B1 | 1/1994 |
| 6,227,618 B1 | 5/2001 | Ligon, Sr. et al. ..... 297/284.4 | EP | 0 434 660 B1 | 5/1995 |
| 6,254,186 B1 | 7/2001 | Falzon ............... 297/284 | EP | 0 540 481 B1 | 12/1995 |
| 6,254,187 B1 | 7/2001 | Schuster, Sr. et al. ... 297/284.1 | EP | 0 662 795 B1 | 12/1996 |
| 6,270,158 B1 | 8/2001 | Hong ............... 297/284.4 | EP | 0 702 522 B1 | 3/1997 |
| 6,296,308 B1 | 10/2001 | Cosentino et al. ...... 297/284.4 | EP | 0 696 251 B1 | 7/1997 |
| 6,334,651 B1 | 1/2002 | Duan et al. ........... 297/284.4 | EP | 0 746 219 B1 | 11/1998 |
| 6,371,558 B1 | 4/2002 | Couasnon | EP | 0 797 399 B1 | 11/1998 |
| 6,375,255 B1 | 4/2002 | Maruta et al. | EP | 0 698 360 B1 | 3/2000 |
| 6,634,046 B1 | 10/2003 | Schuster ............... 5/652 | FR | 2 596 334 | 10/1987 |
| 6,736,459 B1 | 5/2004 | Sturt | GB | 1 423 617 | 2/1976 |
| 2002/0041121 A1 | 4/2002 | Takata | GB | 2 013 487 | 2/1978 |
| 2002/0125753 A1 | 9/2002 | Kammerer | SU | 587924 | 2/1978 |
| 2002/0185904 A1 | 12/2002 | Carlson et al. | WO | WO/00/00064 | 1/2000 |
| 2003/0071501 A1 | 4/2003 | Cruz Fernandes de Pinho et al. ............... 297/284.4 | WO | WO 2003/022626 A1 | 3/2003 |
| 2004/0108760 A1 | 6/2004 | McMillen ............. 297/284.4 | WO | WO 2004/043207 A2 | 5/2004 |
| | | | WO | WO 2004/043730 A2 | 5/2004 |

FOREIGN PATENT DOCUMENTS

DE            2040794          7/1971

AUTOMATICALLY ACTUATING ERGONOMIC SUPPORT SYSTEM FOR A FOLD DOWN SEAT

CROSS-REFERENCE TO RELATED APPLICATIONS

This application is a continuation in part claiming priority to the application for Fold Down Seat Lumbar Support Apparatus and Method filed on Jan. 22, 2003, now U.S. Pat. No. 6,905,107 application Ser. No. 10/349,525 and also a continuation in part of application Ser. No. 10/361,475 filed Feb. 10, 2003.

STATEMENT REGARDING FEDERALLY SPONSORED RESEARCH OR DEVELOPMENT

Not Applicable.

BACKGROUND OF THE INVENTION

1. Field of the Invention

This invention is in the field of an automatically actuating ergonomic support system for automobiles.

2. Related Art

Lumbar supports for automobile seats are a known and popular ergonomic option. Whether lumbar supports are static or variable, their effect depends upon the creation of depth in the portion of the seat positioned to correspond to the passenger's lumbar spine. Head rests and thigh supports are also common ergonomic options.

Another popular feature in vehicles having cargo space such as sport utility vehicles, station wagons and the like, is fold down rear seats. Folding these seats down increases the cargo space. For that purpose, it is advantageous that the seat backs for the fold down rear seats be as thin as possible in their down position. Any reduction in the depth of the seat back when it is folded down increases the amount of available cargo space above it.

For passengers sitting in the fold down or "third row" seats, lumbar, thigh and head supports remain a desirable feature. If conventional lumbar, thigh and head supports are installed in fold down rear seats, however, their bulk interferes with the space conservation necessary to maximize cargo space.

Another problem for fold down rear seating is that their installation in a recess in the floor of the cargo space makes the use of conventional levers or hand wheels on the sides of the seats impractical. Therefore, actuating fold down seats is problematic.

Hence, there is a need in the industry for an automatically actuating ergonomic support system for a fold down rear seat that includes lumbar, thigh, and head support. These ergonomic supports must have depth when the seat is in its up position and must be as thin as possible when the seat is in its down position. All ergonomic supports need to be actuated into their support position simply by folding the seat up.

SUMMARY OF THE INVENTION

It is in view of the above problems that the present invention was developed. The present invention is an automatically actuating ergonomic support system for a fold down rear seat for a motor vehicle that includes lumbar, thigh, and head supports. The lumbar support has depth in the lumbar area of a seat back when the seat is in its up position, and automatically reduces that depth when folded down into its stowed position. The thigh and head supports comprise pivoting bolsters and rests that likewise extend to support the side and front of the thighs, and the head of the passenger when the seat is up, and retract when it is down.

A seat back frame is operatively engaged with a seat bottom frame and it is movable between a stowed position for cargo use and an up other position for seating passengers. Ergonomic supports are mounted on the seat back frame and/or the seat bottom frame. Each ergonomic support has a retracted position and an extended position.

The ergonomic supports are actuated to move between their retracted and extended positions by traction cables. The traction cable has a sleeve and a wire disposed to slide axially through the sleeve. A first sleeve end and a first wire end are engaged with the ergonomic support. A second sleeve end is engaged with one of the seat bottom frame or the seat back frame, and a second wire end is engaged with the other of the seat bottom frame or the seat back frame. Movement of the seat back frame from its stowed position applies traction to the traction cable such that the traction cable moves each ergonomic support from its retracted position to its extended position.

Alternatively, a seat bottom may be comprised of a seat bottom frame and a seat bottom base. Both frame and base are horizontal squares joined at the corners by four pivoting legs, which allow the seat bottom to move between retracted and extended positions. In this embodiment, the second sleeve end is engaged with one of the seat bottom frame or the seat bottom base, and the second wire may be engaged with the other of the seat bottom base or the seat bottom frame. Therefore, a movement of seat bottom frame from the flat position to the up position applies traction to the traction cable such that the traction cable moves the ergonomic support from the retracted position. These mechanisms identically apply to the lumbar, thigh, and head supports.

A lumbar support is in the fold down seat back frame. A traction cable is operatively engaged at one end with the lumbar support. The fold down seat back includes a rotating member and a fixed member. The fixed member may be a torsion bar. The rotating member may be a mount, a cable tension unit, or other device operatively engaged with the other end of the traction cable and with the fixed member. The rotating member moves relative to the fixed member when said fold down seat back is folded down.

The first sleeve end is attached to one of the fixed member or the rotating member; the first wire end is attached to the other member. The wire end may be attached to the torsion bar with a pulley. These attachments of the sleeve end and the wire end cause the wire to be drawn axially through the sleeve when the seat back is folded up, extending the lumbar support, and cause the wire to be relaxed when the seat back is folded down, flattening the lumbar support when the seat back is folded down.

A thigh support is in a fold down seat bottom frame. A traction cable sleeve end is engaged with the seat back frame and a traction cable wire end is located in an automatic actuator engaged with a torsion bar in order to actuate the traction cable, also in the manner previously described. The thigh support incorporates pivoting bolsters mounted on a front and two side members of the seat bottom frame. The opposite sleeve end and wire end, each is respectively engaged with a fixed portion and a moving portion of the bolster in order to move the moving portion when traction is applied, to support the side and front thighs of a seat occupant, according to known techniques as described above for actuation of the lumbar support. These side and front thigh supports are automatically actuated when the seat back frame is folded up into a position for seating.

A head support device is on in the fold down seat back frame. Like the lumbar support, a traction cable sleeve end is engaged with the seat back frame and a traction cable wire end is attached to a torsion bar in order to actuate the traction cable. The head support incorporates a pivoting head rest mounted on a horizontal support member of the seat back frame. The opposite sleeve end and wire end, each is respectively engaged with a fixed portion and a moving portion of the head rest in order to move the moving portion when traction is applied, to support the back of the seat occupant's head, again according to known techniques as described for actuation of the lumbar supports. The head support is automatically actuated when the seat back frame is folded up.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
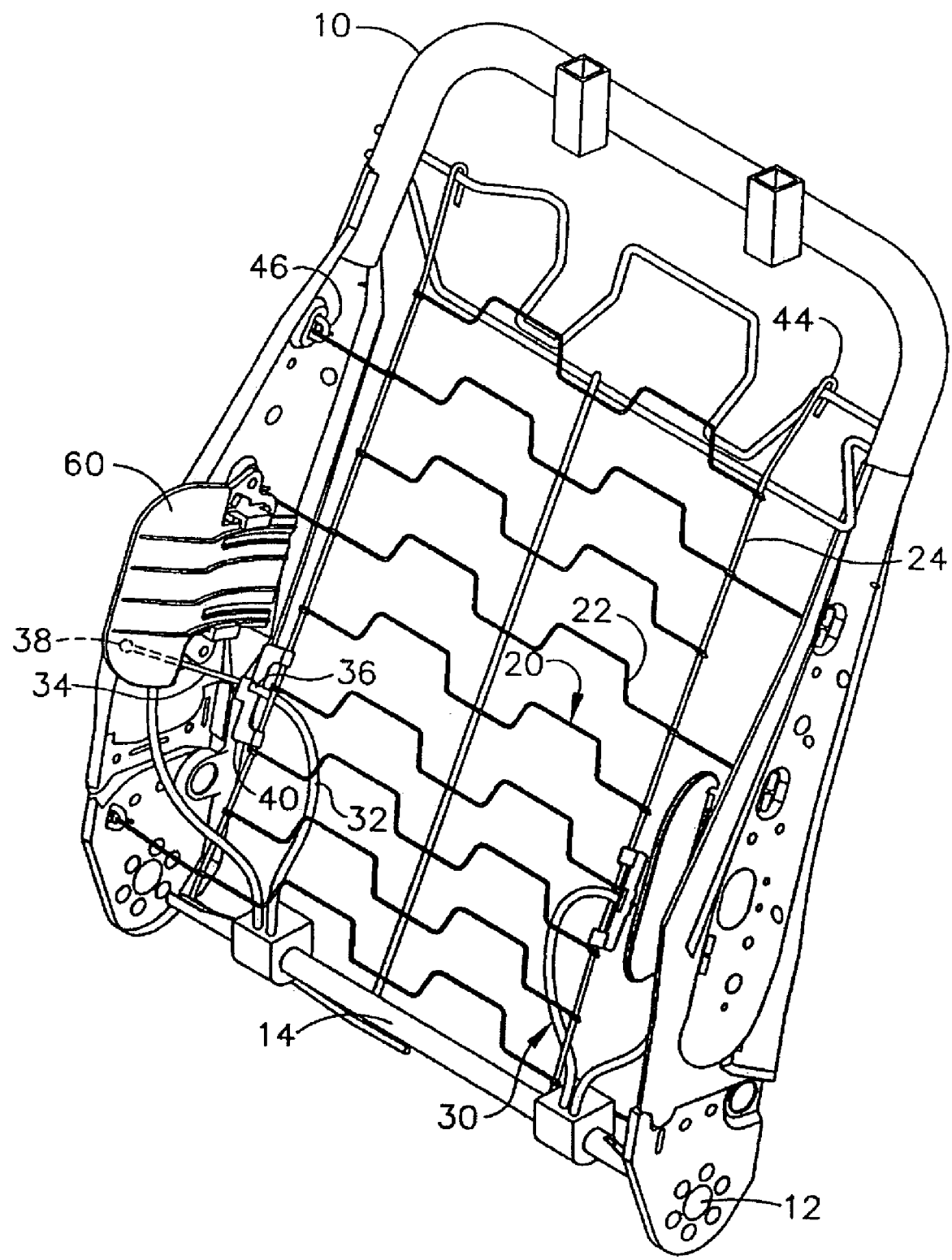
FIG. 1 is an isometric view of the automatic lumbar support as installed in a seat frame.
Figure 2:
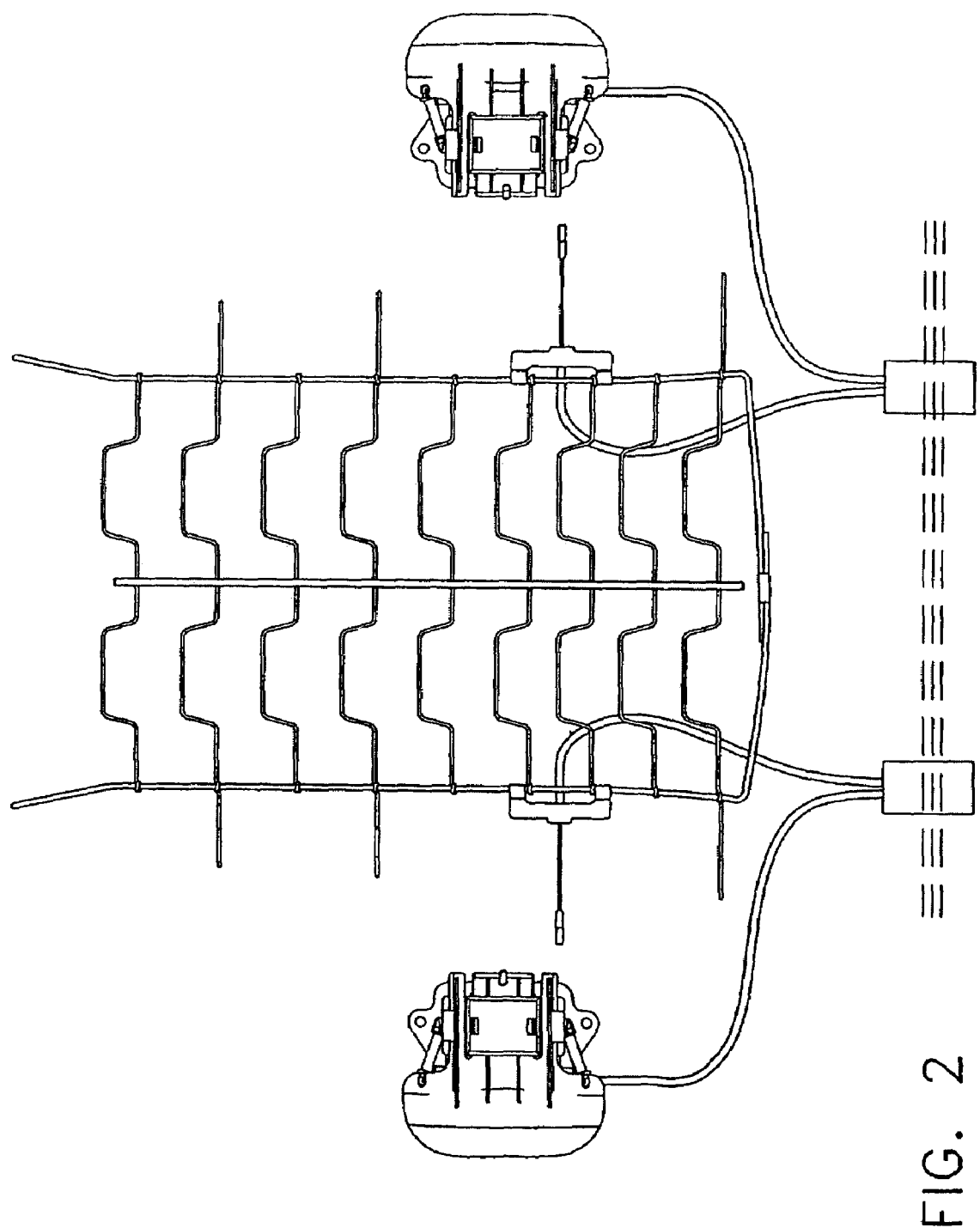
FIG. 2 is a schematic front view of the automatic lumbar support.

Referring to the accompanying drawings in which like reference numbers indicate like elements, FIG. 1 is an isometric view of the automatic lumbar support for a fold down seat back of the present invention. Seat back frame 10 is hingedly connected to a seat bottom frame (not shown) at connection 12. Although other connections between seat backs and seat bottoms are possible, it is common for a hinge connection such as that depicted to include a torsion bar 14. It is also common for a torsion bar 14 to be fixed such that it remains stationary at all positions of the seat back, and does not move when the seat back moves. Lumbar support 20 is mounted on seat back frame 10.

It is appreciated by those in the art that many variable types of lumbar supports are known, including many lumbar supports that are actuated by traction cables. Such traction cable actuated lumbar supports include, for example, arching pressure surfaces, such as are disclosed in U.S. Pat. Nos. 5,397,164 and 5,913,569, concave tensionable straps, such as disclosed in U.S. application Ser. No. 10/154,636, push paddles, such as are disclosed in U.S. application Ser. No. 09/798,657, and scissors type supports, such as are disclosed in U.S. application Ser. No. 10/315,320, all of which are incorporated by reference herein. Because all of the referenced lumbar supports share the common feature of being actuated by traction that is applied with a traction cable, actuation of all these lumbar supports are considered to be within the scope of the present invention's automatic traction cable actuation described herein.

In the depicted embodiment, lumbar support 20 is an array of flexible wires including horizontal wires 22 and vertical wires 24. The depicted lumbar support wire array 20 is biased toward a substantially flat position. However, its flexibility allows it to be drawn into an arched or convex position having depth. This arched, convex position is achieved by the application of traction with traction cables.

Traction cables are known in the industry. They are sometimes called "Bowden cables." They include a sleeve or conduit with a cable or wire disposed within the sleeve and capable of sliding axially through it. As installed for use, an actuator at one end of the cable holds the sleeve end stationary while pulling the wire end out of the cable and away from the sleeve end. This achieves a corresponding traction or draw on the opposite end of the wire. The opposite end of the sleeve and wire are both connected to a lumbar support, or to a lumbar support combined with a connection to the seat frame. These connections are designed to move the lumbar support into and out of arched, convex or otherwise lumbar supporting positions in response to the tractive force applied to the first end of the traction cable.

Figure 3:
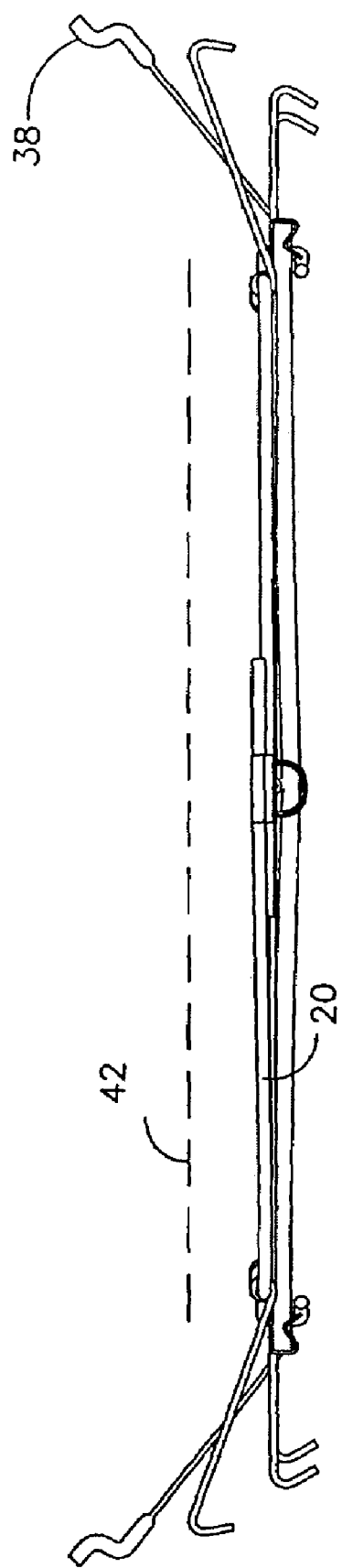
FIG. 3 is a top view of the automatic lumbar support.
Figure 4:
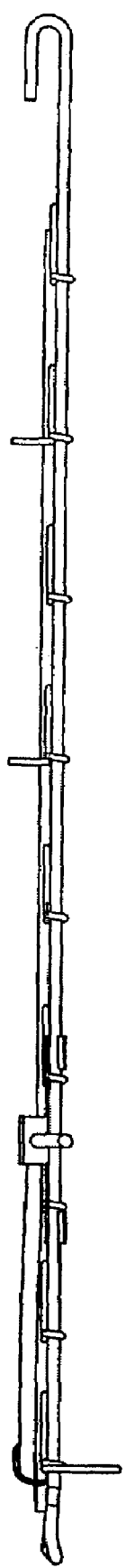
FIG. 4 is a side view of the automatic lumbar support.

In the depicted embodiment, tractive force is used to actuate the lumbar support via traction cables. Traction cable 30 is comprised of a sleeve (or "conduit") 32 and a wire 34 sliding through the sleeve. The sleeve has an end 36 which is fixedly attached to the lumbar support at bracket 40. Wire 34 extends beyond bracket 40. Wire 34 has a hook 38 at its end by means of which the wire end 38 is attached to a hole or a notch in seat frame 10 that is pre-configured to receive wire end hook 38. In the depicted embodiment, this hole or notch to which the wire end 38 is affixed is positioned forward of the bracket 40 and lumbar support 20. As is best seen in FIG. 3, this forward positioning of the wire ends 38 creates a depth of space into which lumbar support 20 may be drawn when traction is applied to the traction cable. Schematic line 42 indicates the greatest extent of lumbar support depth achievable by the depicted embodiment. The difference between schematic line 42 in FIG. 3, and the flat position of lumbar support 20 depicted in FIG. 3 represents both the degree of lumbar support that will be automatically actuated by the apparatus of the present invention, and also represents the amount of space that will be saved upon automatic flattening of the lumbar support when the seat back is folded down into its stowed position.

As indicated above, vertical wires 24 and horizontal wires 22 are flexible. Of course, seat frame 10 is inflexible. Accordingly, when traction is applied to traction cable 30 wire end 38 will not be able to move. Accordingly, sleeve end 36 will move towards the point at which wire end 38 is attached to frame 10. That is, it will move forward. Through bracket 40, this will pull vertical wire 24 forward as well. In the depicted embodiment, this happens simultaneously on both lateral vertical wires. As is evident from FIG. 1, the attachment of brackets 40 and wire ends 38 is located at a position corresponding to the lumbar spine of the seat occupant. Accordingly, a band of support will be created corresponding to the level of brackets 40 in the lumbar area. Wire array 20 is also supported at an upper end at mounts 44 and laterally at mounts 46. These mounts are also flexible, but not being at a level corresponding to the brackets 40, are not drawn forward into a lumbar supporting position. In an alternative embodiment, the entire wire array 20 may be replaced by an array having more rigid wires. For example, vertical wires 24 could be completely rigid and horizontal wires 22 more stiff. In such a case, traction on the traction cables would draw the entire array forward creating a different sensation for a seat occupant which may be more desirable under some circumstances.

Figure 5:
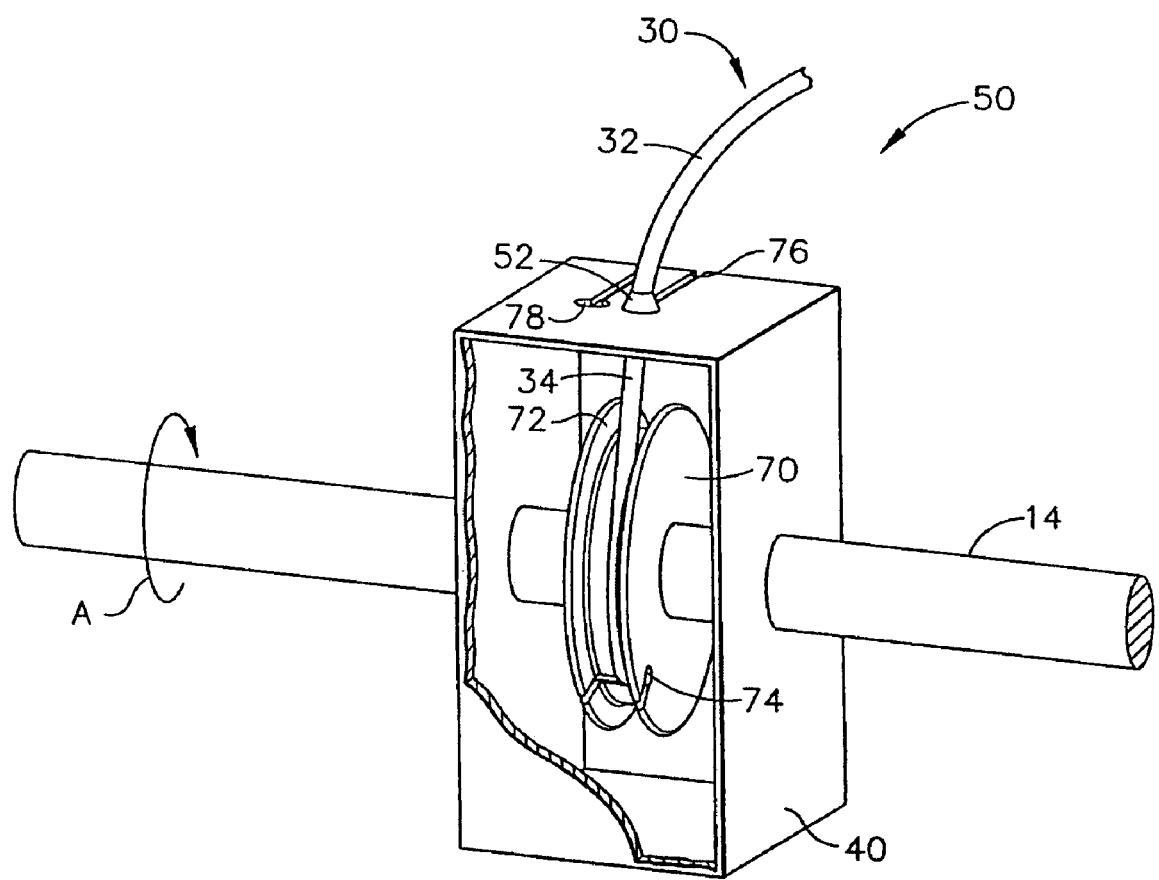
FIG. 5 is a cutaway detail of the cable tension unit.

Traction is applied at cable tension unit 50 (See, FIG. 5). In the depicted embodiment, cable tension unit 50 rotates with the seat frame. Horizontal torsion rod 14 remains stationary, and does not rotate. In alternative embodiments also considered to be within the scope of the present invention, the torsion rod may turn with the seat back while the cable tension unit may remain stationary. Relative motion of the tension unit and torsion rod actuate the traction cable as follows. Cable tension unit 50 will have a hole or slot or channel narrowly dimensioned to allow passage therethrough of the traction cable wire 34, but too narrow to allow passage of the traction cable sleeve 32. Within the cable tension unit 50 traction cable wire 34 is attached to torsion rod 14. This attachment may be by any of a wide variety of known means of mechanical attachment, including without limitation, pulleys, levers and the like. When the seat back is folded upwards into its up position, the tension unit and the cable sleeve end 52 mounted on it rotate away from the attachment of the traction cable 34 to the torsion rod 14. The relative motion of cable tension unit 50 and torsion rod 14 will apply traction to draw the traction cable wire 34 out of and through the traction cable sleeve 32. As explained above, this traction at the first end of the traction cable will engage and actuate the lumbar support 20 at the other end of the traction cable, causing it to be drawn by traction into its lumbar supporting position.

Also depicted are bolsters 60. Bolsters are paddles deployed on the sides of the seat for lateral support of the passenger. They are also actuated by traction in a known manner. Like the lumbar support, bolsters 60 have a non supporting flat position and a supporting extended position. The extended position has a greater depth, front to back, than the retracted or flat position. Actuation of the bolsters to move them into their extended position is achieved by connecting the traction cable 30 to the cable tension unit in the same manner as described above for actuation of the lumbar support 20.

The converse operation is folding down the seat back. Moving the seat back down will again move the cable tension unit 50 and the torsion rod 14 relative to each other. The cable tension unit is deployed such that this motion of the seat back downwards will move the cable sleeve end 52 and the attachment of the traction cable wire 34 closer to one another. This relaxes tension on the first end of the traction cable, which in turn reduces the distance between the second traction cable wire end 38 and a traction cable sleeve second end 36. Accordingly, this relaxation of traction on the traction cable allows the lumbar support 20 and bolsters 60 to return to their untensioned, flat position. This return to the flat position is aided by the inherent spring or bias of the lumbar support wires 22 and 24 towards a flat position. It is also aided by the weight of the seat, weight of the cargo and force of the user pushing down on the back of the seat back.

FIG. 5 is a cutaway detail of the cable tension unit 50. The cable tension unit is fixedly attached to seat back frame in the depicted embodiment (not shown). Again, the torsion rod 14 could be fixedly attached to the seat back with the cable tension unit being fixedly attached to the seat bottom, as an alternative design. The present invention may be actuated by either one component being attached to the seat back and the other component fixed to the bottom or otherwise fixed to the car frame, so long as the cable tension unit 50 and torsion rod rotate relative to one another.

Pulley 70 is attached to torsion rod 14 inside of the cable tension unit 50. Pulley 70 is fixedly attached to the torsion rod 14 so that it does not move relative to the torsion rod 14. Pulley 70 is designed to pick up and release traction cable wire 34. Accordingly, pulley 70 has a circumferential channel 72 into which traction cable wire 34 may be taken up. Pulley 70 also has a seat 74 into which a bullet at the end of tension cable wire 34 may be inserted upon assembly. In operation, wire bullet seat 74 will hold the wire end in place as tension is applied. A slot 76 is fabricated into a wall of cable tension unit 50. This slot is used in assembly to lead the traction cable wire 34 through the cable tension unit to where it can be seated on pulley 70. Slot 76 also includes a keyhole or a widening which forms another seat 78 for receiving the traction cable sleeve end 52. Hence, keyhole seat 78 is wide enough to allow passage of the traction cable wire 34 therethrough, but not passage of the traction cable sleeve 32.

In operation, when the seat back frame is rotated up, cable tension unit 50 will also rotate up or in the direction indicated by arrow A in FIG. 5. In so doing, traction cable sleeve seat 78 and the traction cable sleeve end 52 seated within it will be moved away from where the traction cable wire 34 is anchored to the stationary pulley at 74. This will of course have the effect of drawing the traction cable wire 34 through the traction cable sleeve 32, and consequently applying traction to it. This traction will effect actuation of the lumbar support and, optionally, bolsters at the other end of the traction cable. Accordingly, when the seat back is up, the traction cable is tensioned and the lumbar support is out. When the seat back is folded down, or opposite to arrow A in FIG. 5, cable tension unit 50 is rotated in a direction that will move the traction cable sleeve end 52 closer to the traction cable wire end anchor 74, allowing the tension on the wire to be reduced and allowing the wire to slide back into the sleeve 32. Accordingly, released tension on the other end the traction cable will allow the lumbar support, and optionally bolsters, to flatten, thereby reducing the thickness of the seat back in its folded down position, increasing cargo space.

It is considered to be within the scope of the present invention that various configurations of cable tension units may be used. For example, a traction cable sleeve mount seated in a portion of a seat back frame is combined with a traction cable wire end bullet seat located in the frame of the seat bottom such that the sleeve end and wire end are separated when the seat is folded up. It is also contemplated to be within the scope of the present invention that the automatic actuation upon folding of the present invention may be combined with any of the variable lumbar support technologies incorporated by reference herein.

Figure 6:
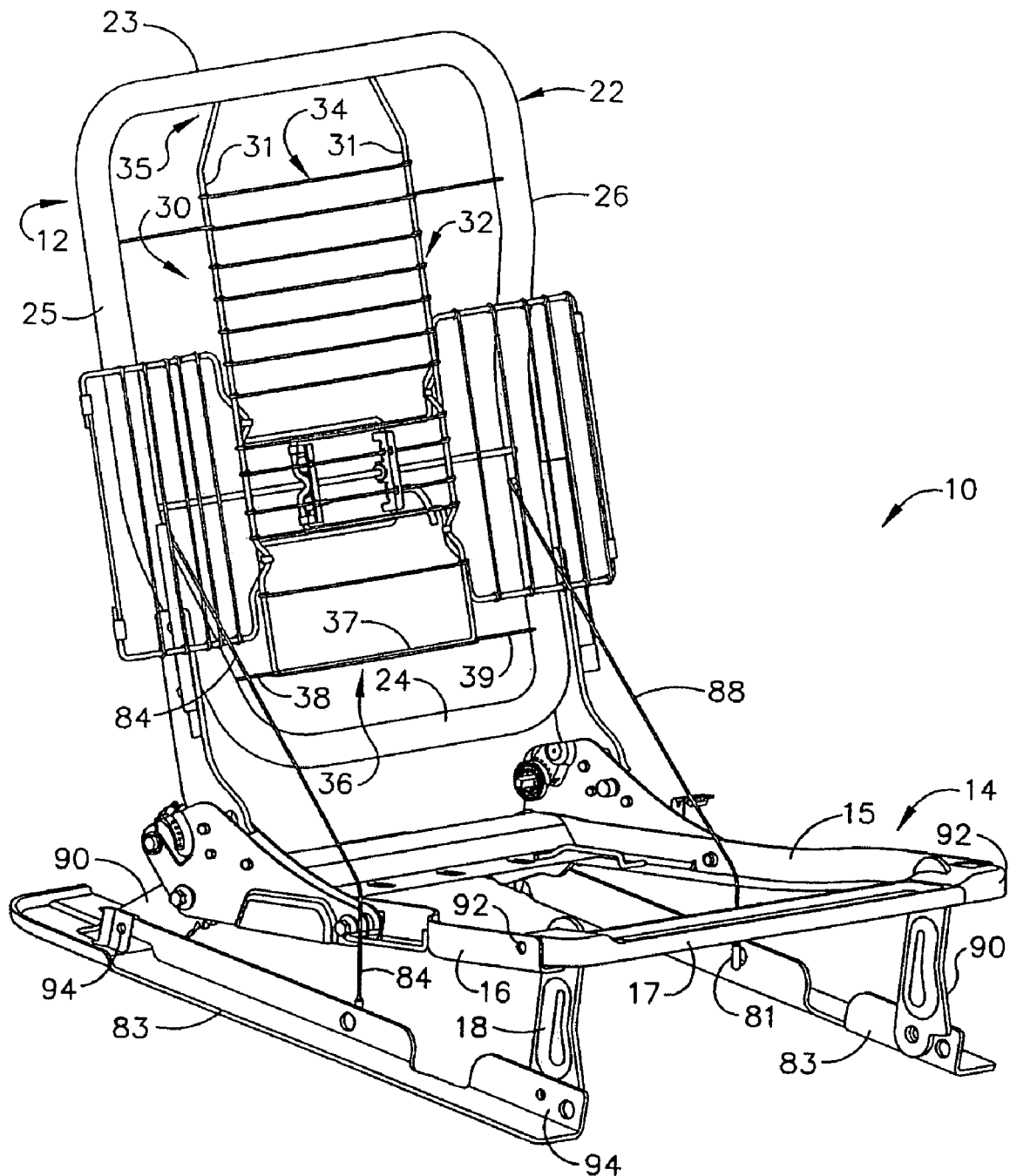
FIG. 6 is an isometric view of the automatic lumbar support as installed in a seat whose seat bottom frame moves on its seat bottom frame base.

FIG. 6 is an isometric view of the automatic lumbar support as installed in a seat whose seat bottom frame 81 moves on its seat bottom base 83. The seat bottom frame has a stowed, flat position and an up position. Four pivoting legs 90 mediate travel between the up and down positions by pivoting on upper pivot pins 92 and lower pivot pins 94.

Traction cable 88 is composed of a sleeve 82 and a wire 84 sliding through the sleeve. One end of the sleeve 82 and wire 84 are connected to a lumbar support. The opposite end of the sleeve and wire are engaged with seat bottom frame 81 and seat bottom base 83, respectively. Alternatively, the opposite end of the sleeve and wire may be engaged with seat bottom base 83 and seat bottom frame 81, respectively. When seat bottom frame 81 moves up from the flat position, the movement applies traction to traction cable 88 such that traction cable 88 moves the lumbar support from a retracted position. This configuration is also considered to be within the scope of the present invention.

Lateral Bolsters

Figure 7A:
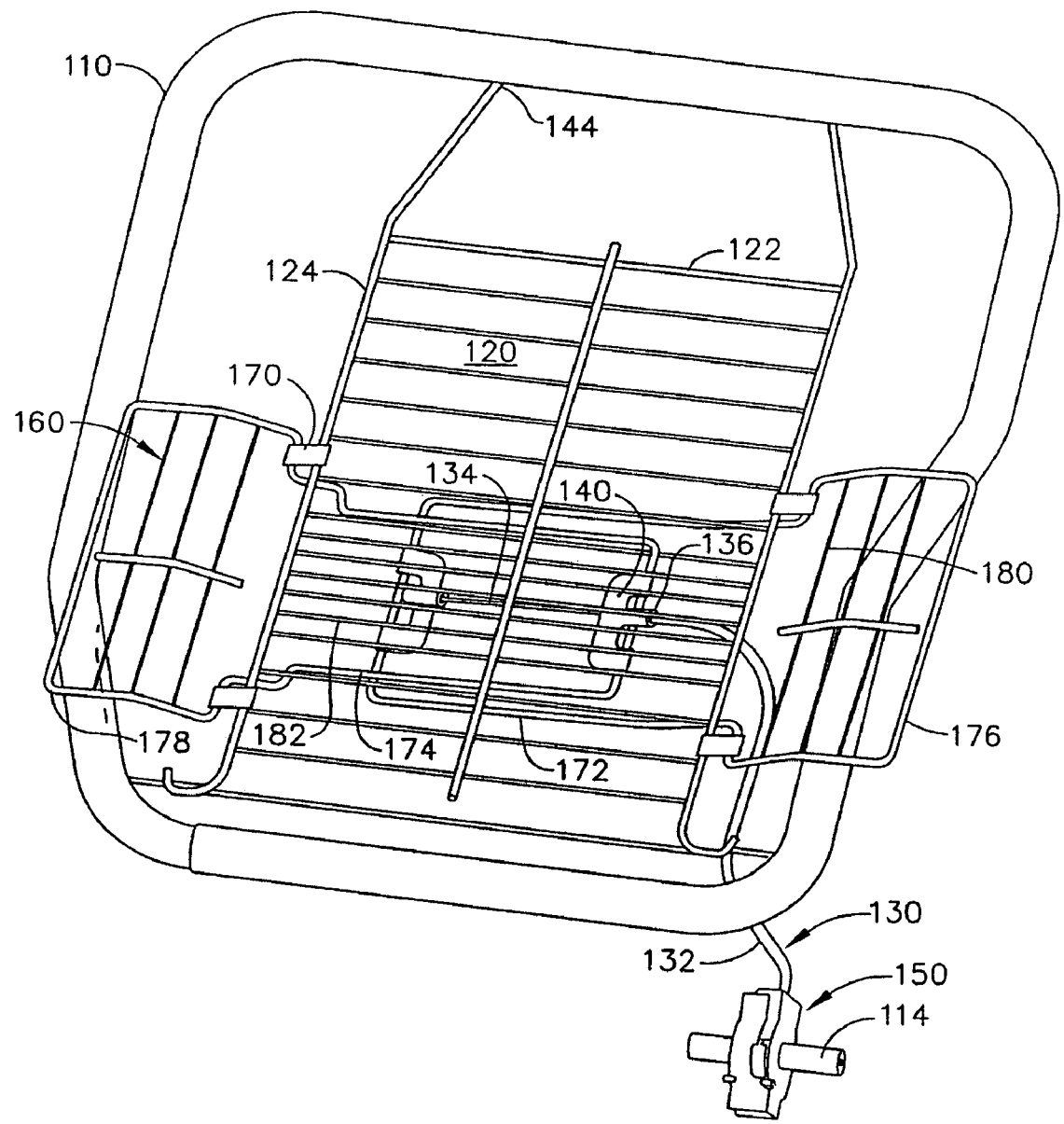
FIG. 7A is a perspective view of an alternative embodiment.
Figure 7B:
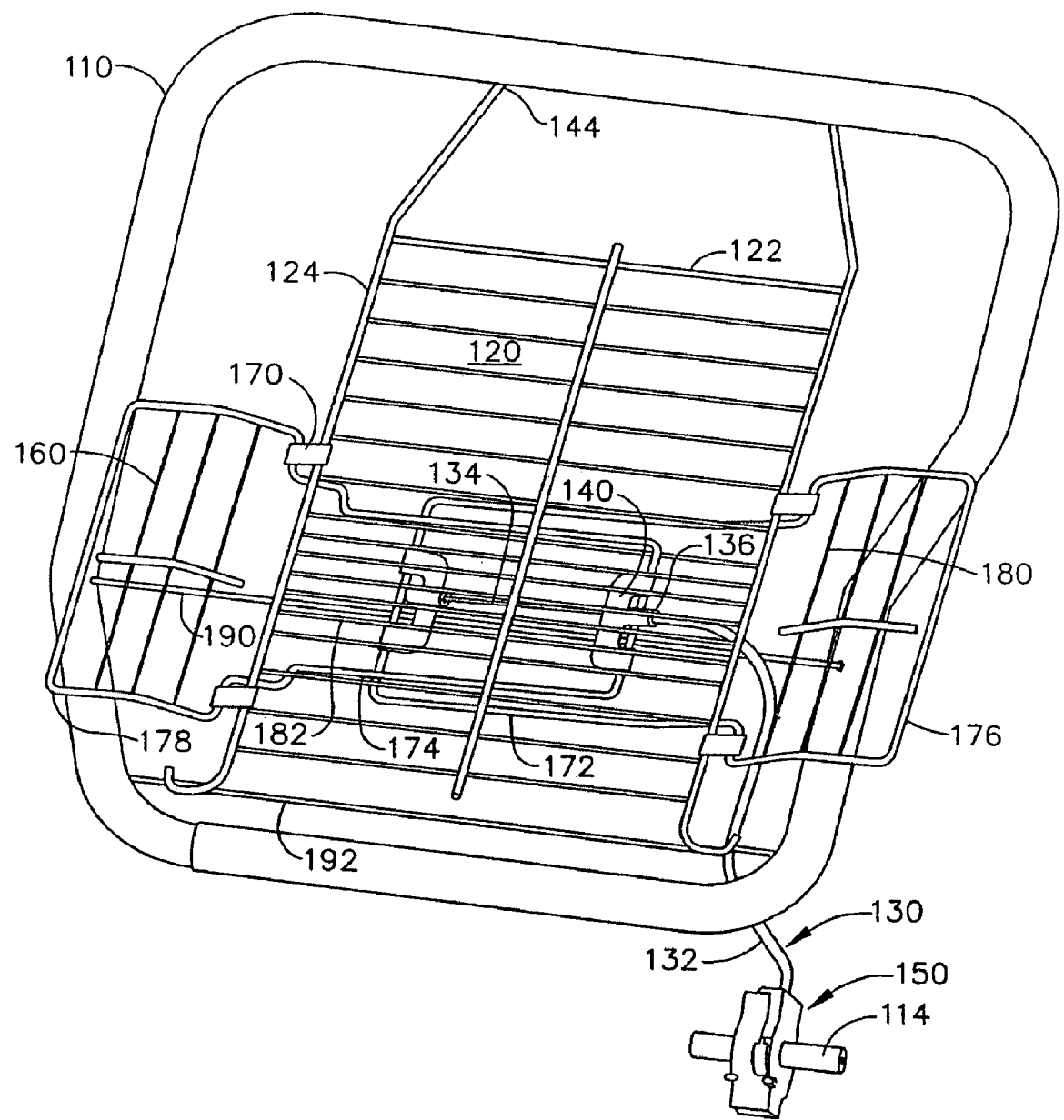
FIG. 7B is a perspective view of an alternative embodiment with a horizontal guide rail.
Figure 8:
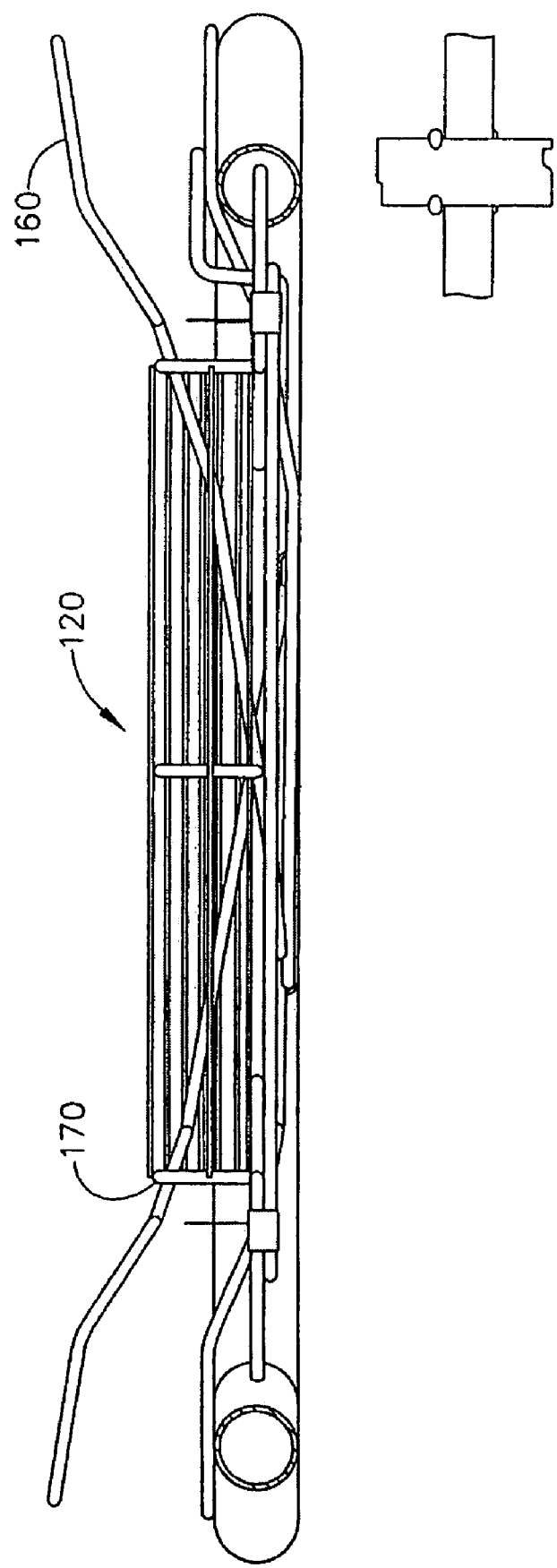
FIG. 8 is a bottom view of an alternative embodiment.

A first alternative embodiment is depicted in FIGS. 7A, 7B and 8. The embodiment incorporates pivoting side bolsters 160. Rigid seat frame 110 has lumbar support wire array 120 mounted on it at mounts 144, which are the ends of vertical wires 124. Vertical wires 124 may be rigid or semi-rigid.

Torsion rod 114 is mounted to and engaged with the overall seat frame in a manner substantially equivalent to that depicted in FIG. 1 and described in the accompanying text. Substantially equivalent actuator 150 is engaged with torsion rod 114 in order to actuate Bowden cable 130, also in the manner previously described.

Bolsters 160 are mounted with pivoting clamps 170 to vertical rods 124. Each bolster 160 is comprised of a rigid wire having a medial aspect 172 and 174 and a lateral aspects 176, 178. The lateral aspects 176 and 178 comprise pressure surfaces proximate to a seat cushion and, therethrough, the seat occupant and that will support the seat occupants' weight. These lateral portions 176 and 178 may be augmented by supporting wires 180.

Attached to each medial aspect 172 and 174 is a bracket 140. Bowden cable sleeve 132 is attached to a first bracket at 136. Bowden cable wire 134 is attached by a similar mount at opposing bracket 140. Brackets 140 are disposed in an opposing fashion around a vertical midline. Accordingly, when traction is applied to the Bowden traction cable 130, the wire end being drawn into the sleeve end will cause the brackets 140 to approach one another. Traction is actuated by actuator 150 in the manner described above.

Upon application of traction, brackets 140 will be constrained from approaching one another on the same plane because of the restraint of pivoting clamps 170 holding bolster wires 160 from inward movement by their attachment to rigid or semi-rigid vertical wires 124. Pivoting clamps 170 are the only attachment of bolsters 160 to the lumbar support 120. Accordingly, continuing traction applied to brackets 140 will cause the bolster wires 160 to rotate around pivoting clamps 170. The medial aspects 172 and 174 will be drawn out of the plane they occupy in their rest position, and in a direction that is away from the viewer and out of the plane of the page in FIG. 7A, and towards the bottom of FIG. 8. This perpendicular or transverse movement of the medial aspects 172 and 174 will, in conjunction with the rotating or pivoting action of brackets 170, cause the lateral aspects 176 and 178 of bolsters 160 to proceed towards the seat occupant, that is out of plane of the page in FIG. 6 and towards the viewer.

Wire array 120 and the vertical wire 124 that supports it may be rigid. In the embodiment depicted in FIGS. 7A, 7B and 8, the wire array 120 and its vertical rods 124 are flexible. In this case the movement of the lateral bolsters 160 in response to the tension applied by the Bowden cable 130, will also have the effect of arching the wire array 120 outwards at the level at which the bolsters 160 are mounted. This of course is the area corresponding the occupant's lumbar spine. Thereby, actuation of the side bolsters also actuates extension of a lumbar support portion of wire array 120.

An alternative embodiment depicted in FIG. 7B includes a horizontal guide rod 190. In the depicted embodiment this rod is substantially rigid and is fixedly attached to the seat back frame 110. The purpose of this rod is to provide backing resistance to the movement of the medial aspects 172 and 174 of the lateral bolster wires 160. Rod or band 190 may be engaged with the medial aspects of 172 and 174 with a bracket (not shown), or may simply be disposed to slidingly engage the medial aspects 172 and 174 upon their actuation. There may be more than one rod. Its orientation may vary, so long as it provides backing resistance. In any case, the effect of the additional rod 190 will be to keep the medial aspects 172 and 174 within the plane they occupy in their rest position as they are actuated. This in turn will cause all of the front to back motion of the assembly upon actuation to be directed towards the front, that is out of the page in FIG. 7B and towards a seat occupant. This effect will multiply the travel of the wire array 120 and the lateral bolsters 160 towards the seat occupant upon actuation.

It may also be observed in the FIGS. 7A and 7B that vertical wires 124 may or may not be attached to a bottom horizontal mounting rod 192. It will be appreciated by those skilled in the art that if the wire array 120 is to be a flexible version, that the lower versions of wires 124 may be attached to a horizontal mounting rod 192 and that actuation of the device will cause flexion of the wire array 120. The connection between vertical rods 124 and horizontal wire 192 may be pivoting, sliding or otherwise, in known fashions, to accommodate the movement of a flexible wire array 120. Alternatively, the bottom portions of vertical wires 124 may be left attached. In this case, the wire array 120 may be less flexible and more rigid. In such an embodiment, the wire array 120 will still travel towards the seat occupant upon actuation of the device; it will simply do so with less flexion of the wire array 120.

Supplemental lateral wires 182 may be added to wire array 120 in the lumbar region.

Figure 9:
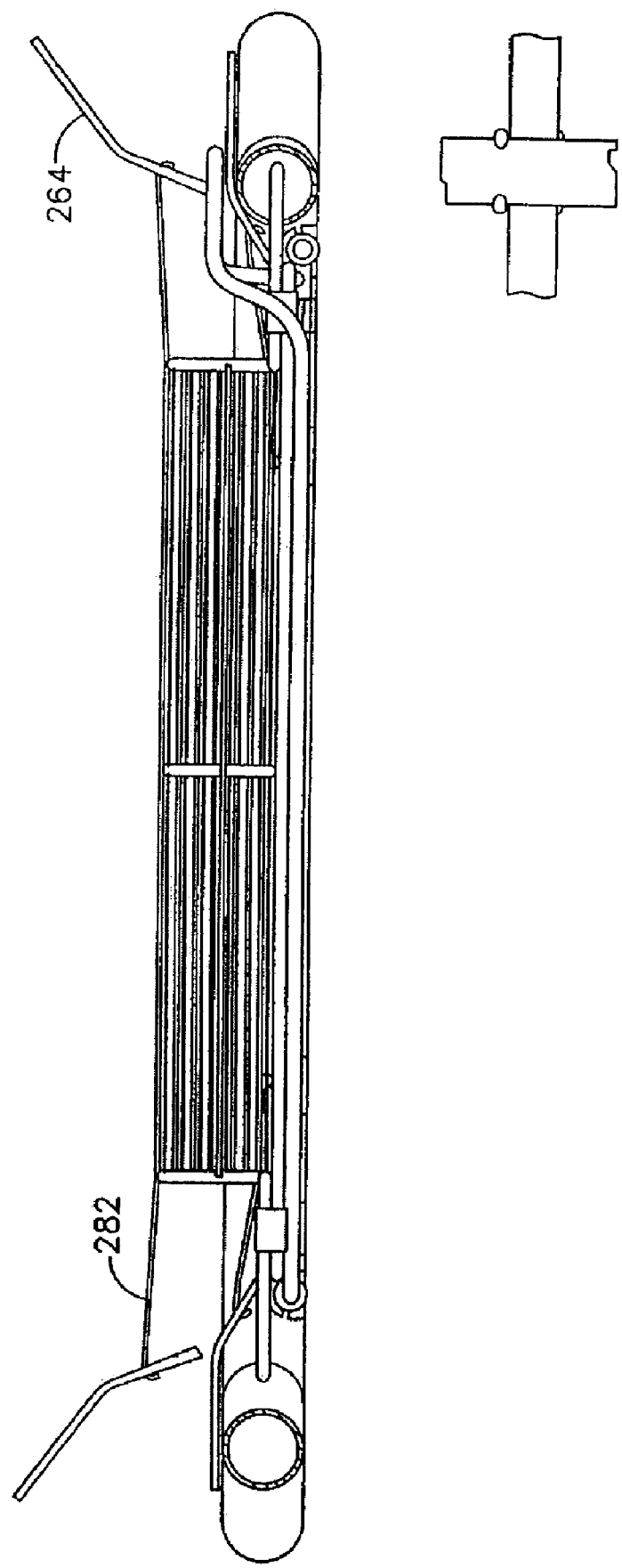
FIG. 9 is a bottom view of another alternative embodiment.
Figure 10:
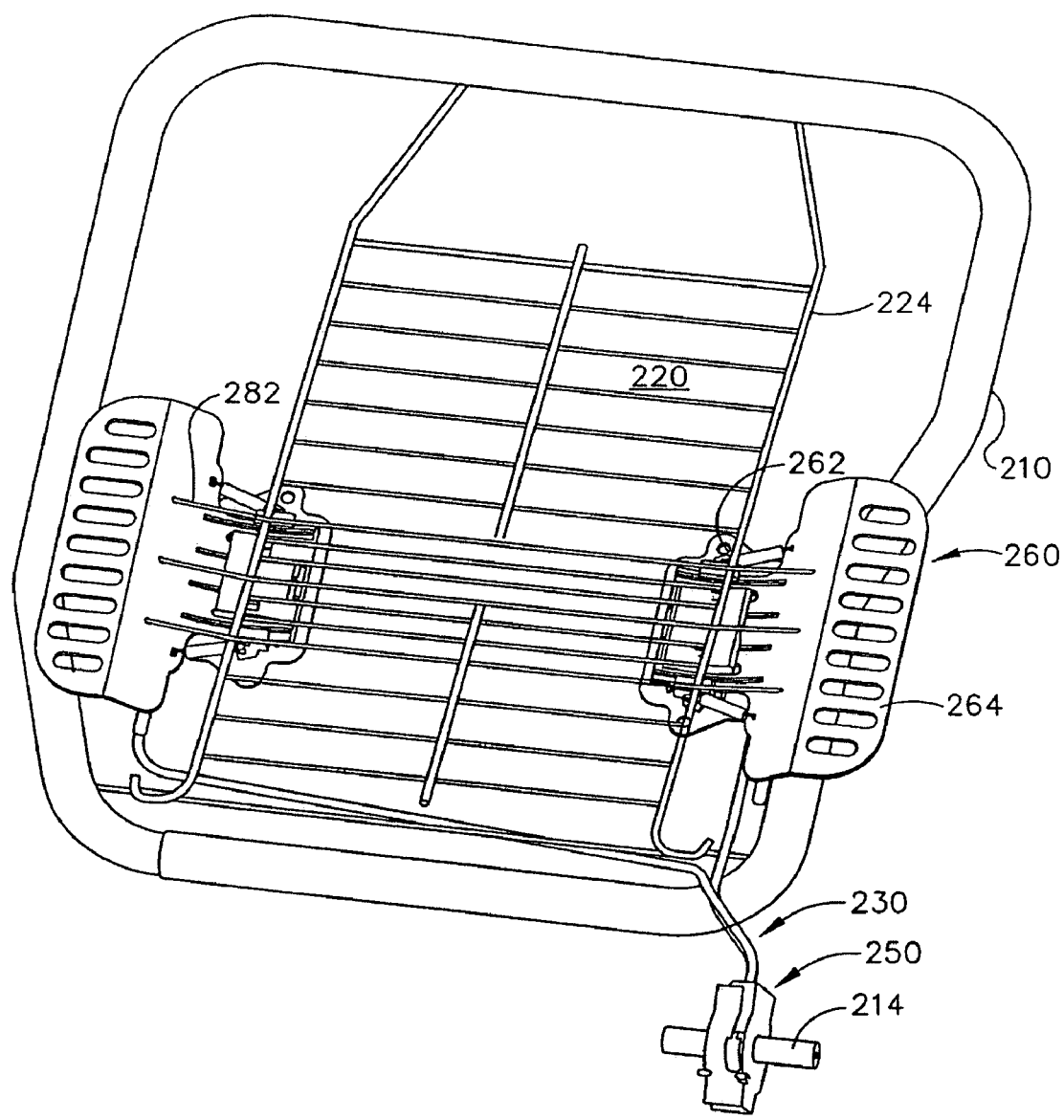
FIG. 10 is a bottom view of another alternative embodiment.

Another alternative embodiment is depicted in FIGS. 9 and 10. In this embodiment lumbar support wire array 220 is either semi-flexible or mounted such that at least a portion of it may move towards a seat occupant.

As before, a seat frame 210 and a torsion bar 214 are cooperatively mounted. An automatic actuator 250 is operatively engaged with torsion bar 214 in order to automatically actuate Bowden traction cable 230. The Bowden traction cable actuates two bolsters 260. A fixed portion of the bolster 262 is attached to seat frame 210 and a moving portion of the bolster 264 moves in and out upon actuation to support a seat occupant, in accordance with known bolster movement apparatuses. The Bowden traction cable 230 has a sleeve and a wire, each being respectively engaged with the fixed portion 262 and moving portion 264 of the bolster 260 in order to move the moving portion 264 when traction is applied, again according to known techniques.

The depicted embodiment also includes lateral wires 282, which are attached at either end to each of the two moving portions 264 of bolsters 260. Lateral wires 282 may be attached to the flexible or semi-flexible lumbar support wire array 220, or may be disposed underneath and behind it. In either case, when the moving portions 264 of bolsters 260 move outwards and towards the seat occupant upon actuation, the lateral wires 282 will also move outwards. As lateral wires 282 move outwards, they will carry with them the flexible or semi-flexible wire array lumbar support 220. In a preferred embodiment, that portion of the wire array 220 that corresponds to the lumbar spine of the seat occupant will be moved. Alternatively, the wire array 220 may be rigid, but movably mounted. ("Outward" means out of the plane of the page and towards the viewer in FIG. 9, and means towards the top of FIG. 10.) In this manner, not only side bolster support but also lumbar support is automatically actuated when frame 210 is folded up into a position for seating.

Figure 11:
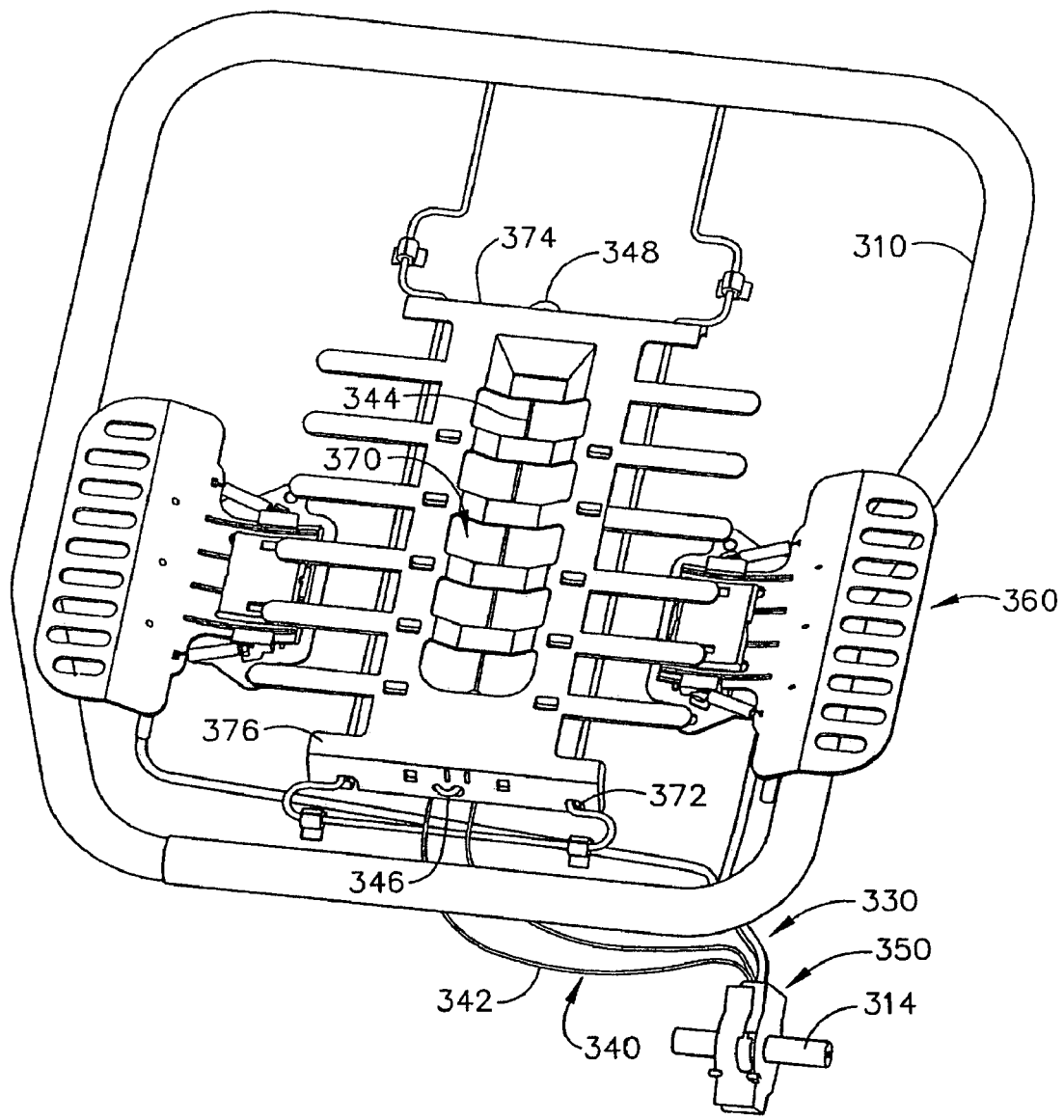
FIG. 11 is a bottom view of another alternative embodiment.
Figure 12:
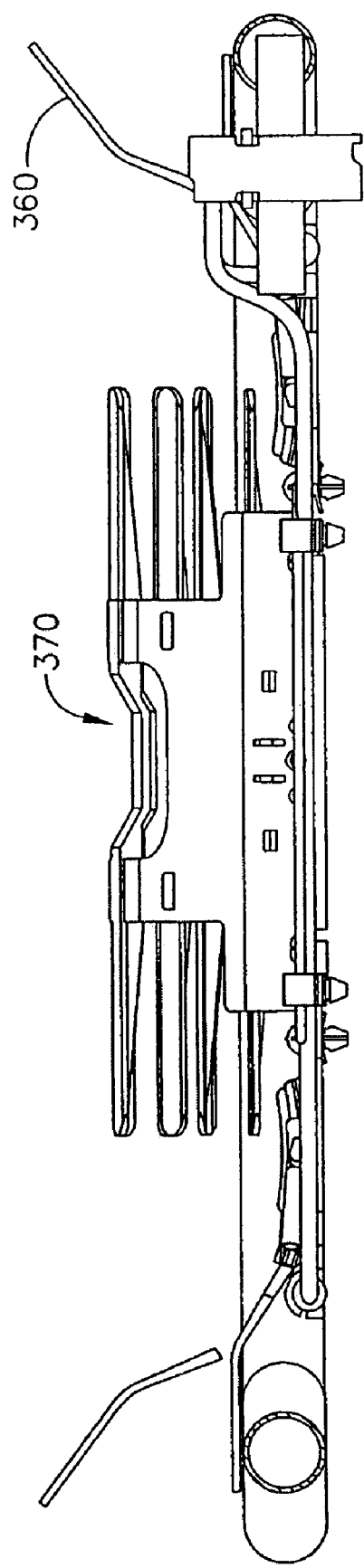
FIG. 12 is a bottom view of another alternative embodiment.

Another embodiment is depicted in FIGS. 11 and 12. This embodiment incorporates an arching pressure surface type of lumbar support sometimes called a "basket," such as those described in U.S. Pat. No. 5,397,164 and U.S. patent application Ser. No. 09/718,263 both of which are incorporated by reference herein. The basket 370 is flexible. It has 2 or 4 sliding mounts 372 that move along rigid guide rods 324, which are mounted to the seat frame 310. A top portion 374 of the arching pressure surface 370 moves towards a bottom portion 376 of the arching pressure surface 370 by sliding along the rigid guide rod 324, which creates a bow or an arch in the arching pressure surface 370 that extends towards the seat occupant and provides lumbar support. In the present embodiment, torsion rod 314, automatic actuator 350 and a first or first pair of Bowden traction cables 330 are mounted and disposed as herein before described. In the embodiment depicted in FIGS. 11 and 12, a second Bowden traction cable 340 is also actuated automatically by actuator 350. Like the other Bowden traction cables, Bowden cable 340 has a sleeve 342 which is mounted at 346 to either the top or bottom portion of the arching pressure surface 370. Bowden traction cable 340 also has a wire 344 which is mounted with wire hook 348 to the other of the top or bottom portions of the arching pressure surface 370. Accordingly, when traction is automatically applied by actuator 350, hook 348 is drawn by wire 344 towards sleeve mount 346, thereby drawings the top 374 and bottom 376 portions of the arching pressure surface 370 towards one another, creating a lumbar supporting arch.

The arching pressure surface may be mounted alone, or in conjunction with bolsters.

Figure 13:
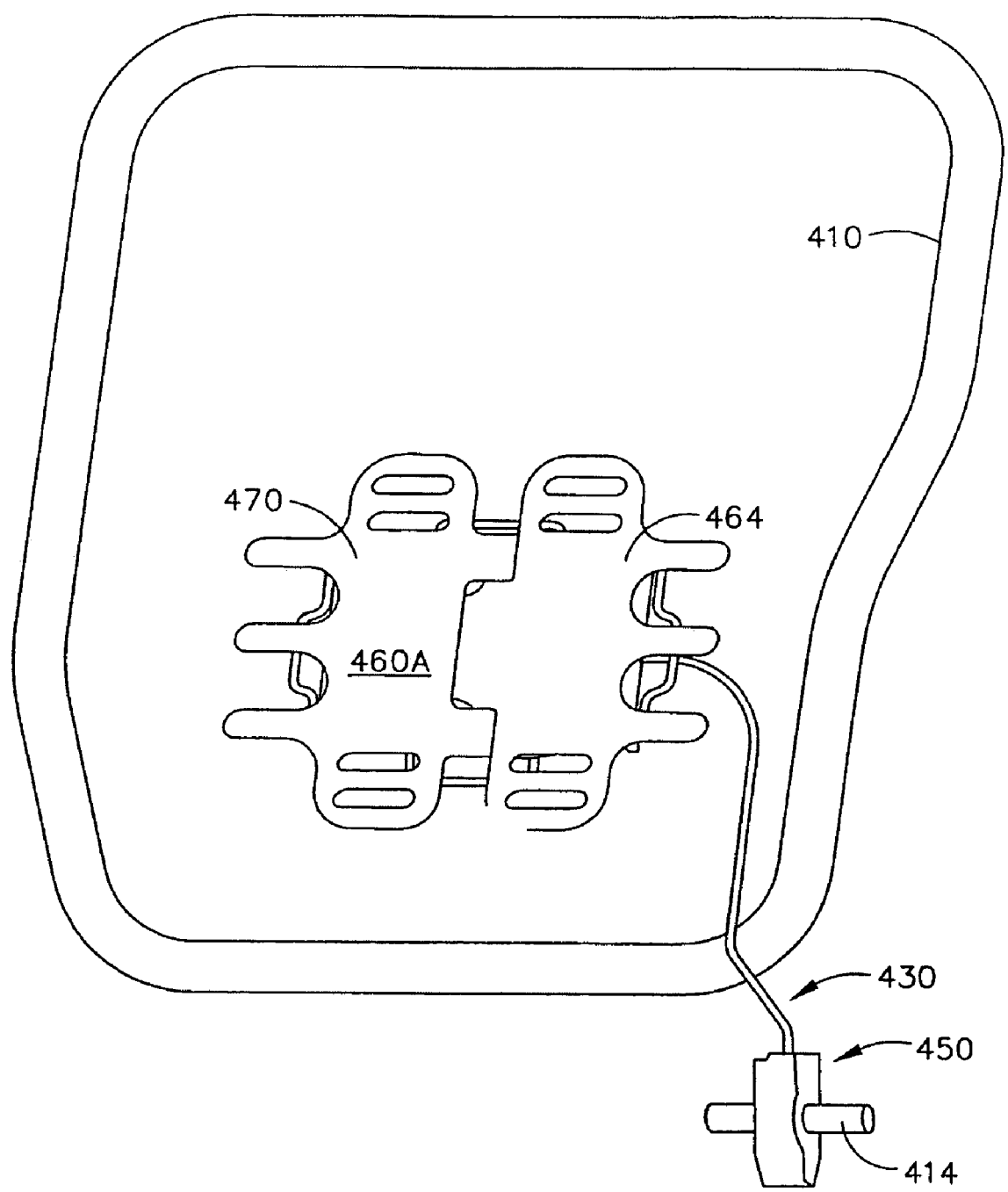
FIG. 13 is a bottom view of another alternative embodiment.
Figure 14:
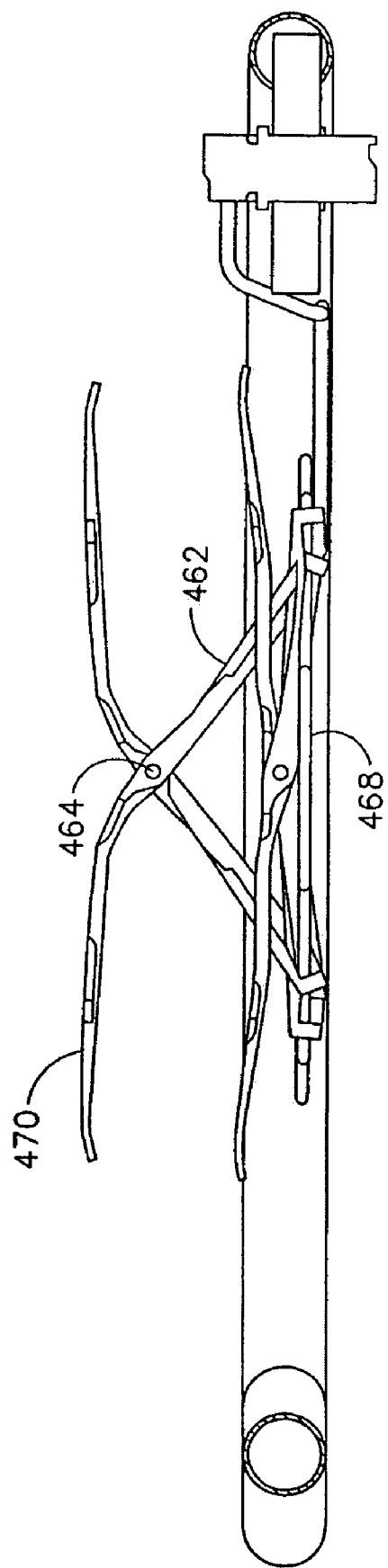
FIG. 14 is a bottom view of another alternative embodiment.
Figure 15:
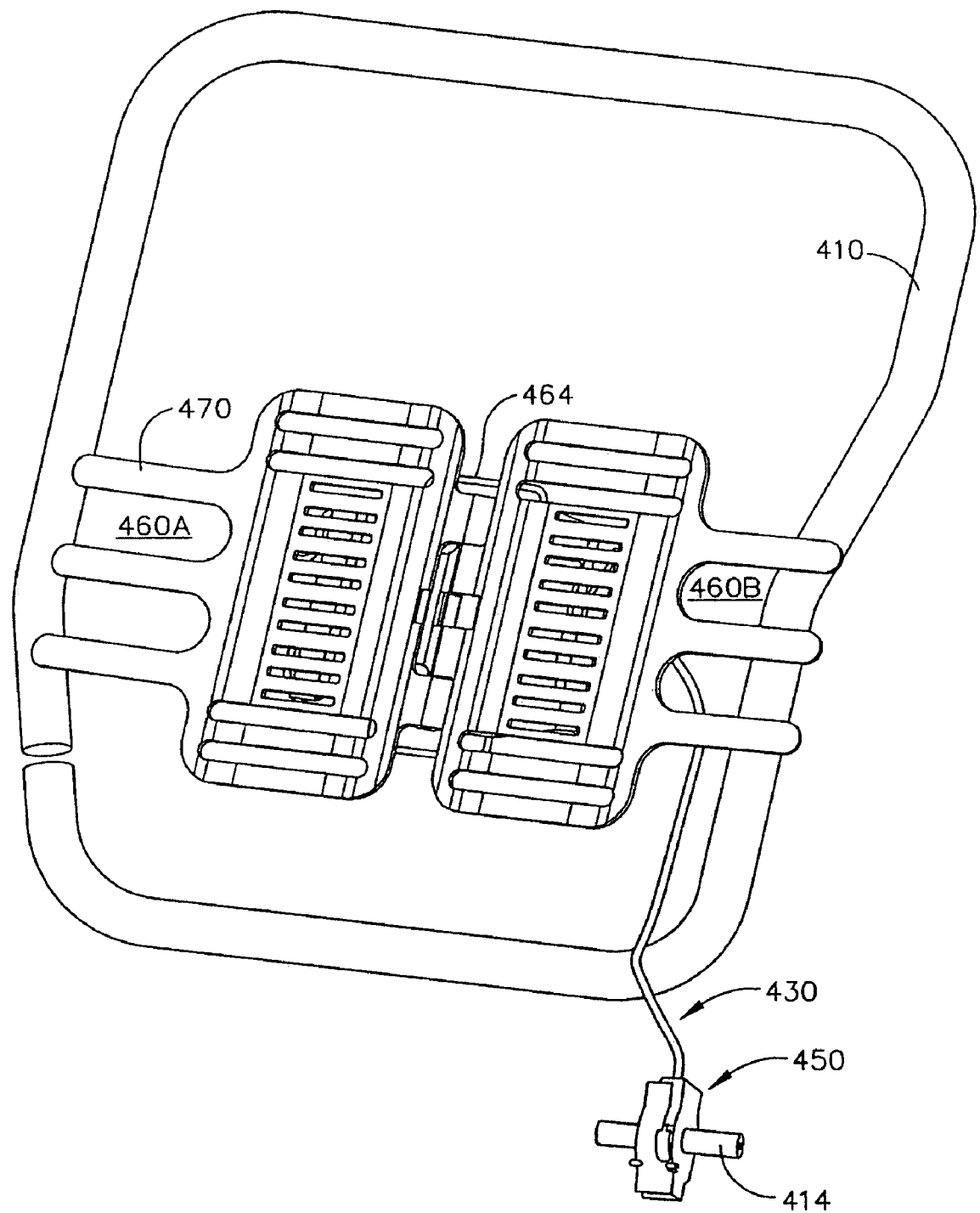
FIG. 15 is a bottom view of another alternative embodiment.
Figure 16:
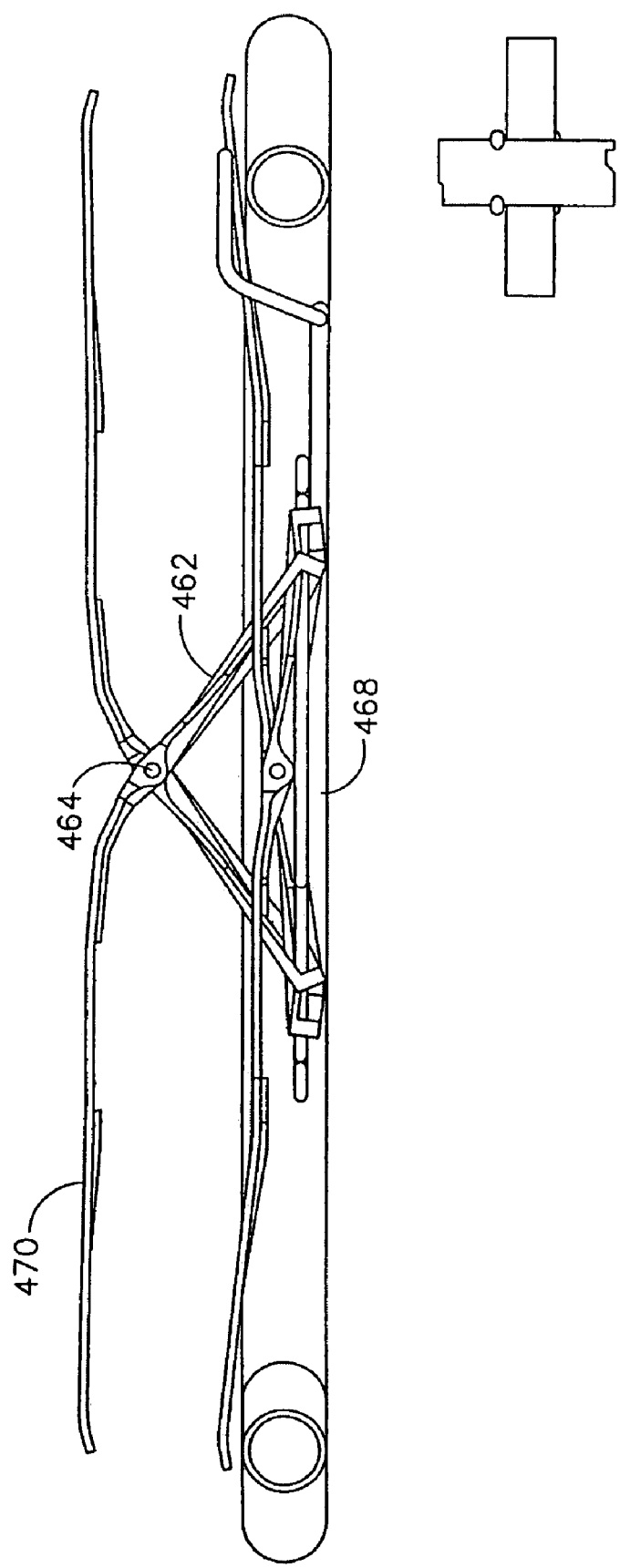
FIG. 16 is a bottom view of another alternative embodiment.

FIGS. 13 and 14 show a first version and FIGS. 15 and 16 show a second version of another embodiment of the present invention. These four figures demonstrate a "scissors" embodiment of the fold down seat automatic actuation system of the present invention. Incorporated by reference is U.S. patent application Ser. No. 10/315,320 which application describes the functioning of scissors lumbar supports upon actuation. Conventional known mounting apparatuses have been omitted from FIGS. 13, 14, 15 and 16 for clarity. As previously, seat frame 410 and torsion rod 414 are interoperatively mounted with the automatic actuator 450 that applies traction to Bowden traction cable 430. The functioning of a scissors lumbar support involves attaching a Bowden cable wire end and a Bowden cable sleeve end to extension lever arms 462.

Scissors lumbar supports are comprised of two wings, 460A and 460B, that are joined together at a hinge 464. The mounting of scissors lumbar support wings 460 is at the ends of rearward lever arms 462, which slide across the mounts upon traction being applied to them by the Bowden cable sleeve end and Bowden cable wire end. This drawing together of the ends of lever arms 462 causes hinge 464 to ride outwards, which is out of the plane of the page and towards the viewer in FIGS. 13 and 15, and towards the top of FIGS. 14 and 16, and which is towards the seat occupant for lumbar support. Opposite the lever arm extensions 462 on each scissors lumbar support wing 460 is support panel 470. Upon actuation, support panels 470 extend towards the seat occupant with pressure in order to provide lumbar support. They are preferably flexible.

A Thigh Support Embodiment

Figure 17:
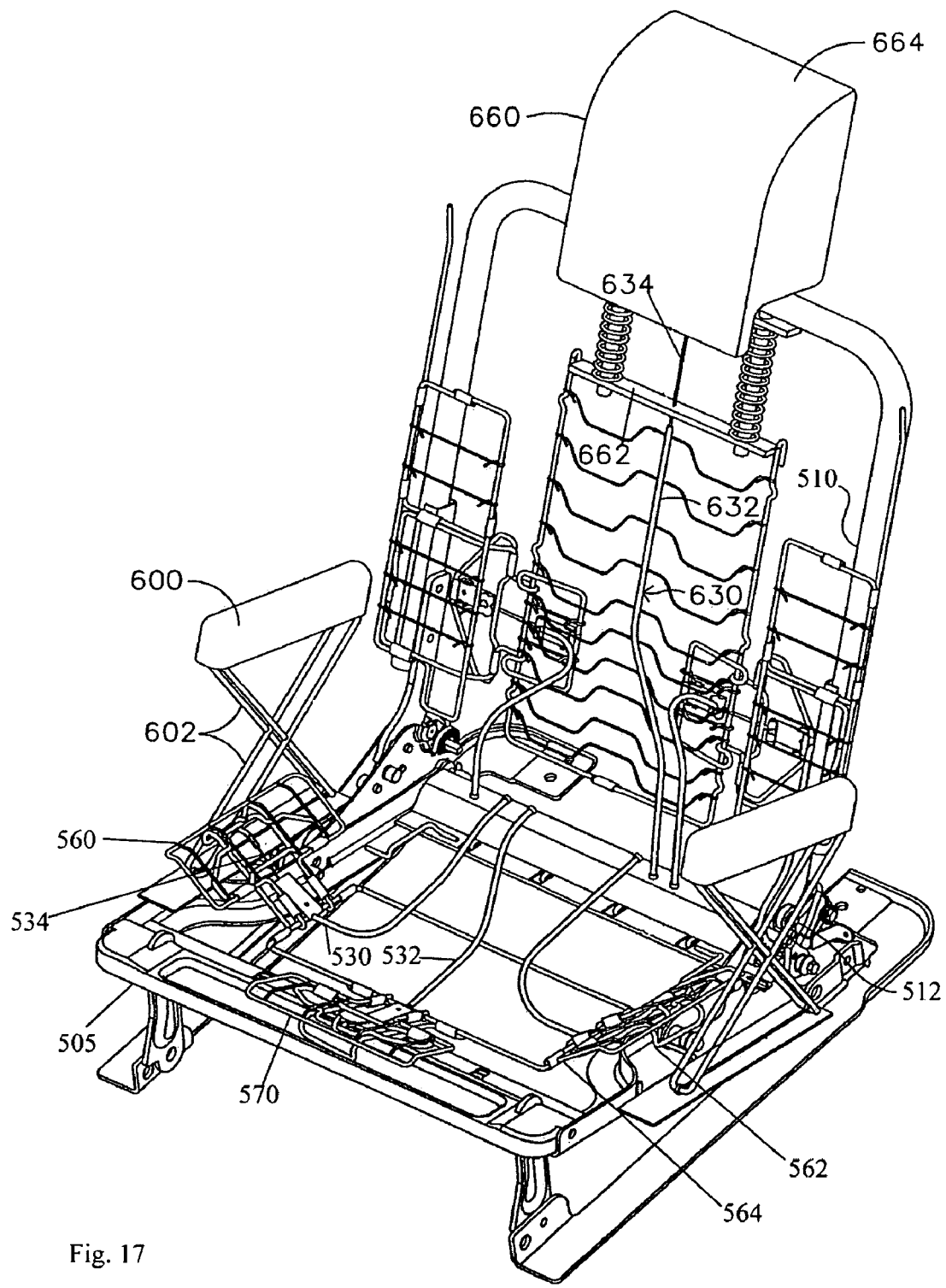
FIG. 17 is an isometric view of the automatic thigh support.

FIG. 17 is an isometric view of the automatic thigh support for a fold down seat of the present invention. The depicted embodiment incorporates two side thigh bolsters 560 that pivot around two side members of a seat bottom frame 505, and a front thigh bolster 570 that pivots around a front member of seat bottom frame 505. Like the lumbar support, bolsters 560 and 570 have a non supporting flat position and a supporting extended position. As described in the lumbar support embodiments, a seat back frame 510 and a torsion bar (obscrured in FIG. 17) are cooperatively munted. Seated back frame 510 is hingedly connected to seat bottom fram 505 at connection 512. THe torsion bar is mounted to and engaged with the overall seat frame in a manner substantially equivalent to that depicted in FIG. 1. An automatic actuator is operatively engaged with the torsion bar in order to automatically actuate Bowden traction cable 530, also in the manner previously described.

In order to actuate Bowden traction cable 530 when the seat back is folded up, the traction cable 530 is attached to the bolsters 560 and 570 through seat back frame 510. A traction cable sleeve mount (not shown) is seated in a portion of seat back frame 510, and at that portion the sleeve 532 has an end. A traction cable wire 534 is attached to its end bullet seat located in automatic actuator engaged with torsion bar 514 such that the sleeve end and wire end are separated when the seat is folded up. A movement of seat back frame 510 from a stowed position applies traction to the traction cable such that the traction cable moves the bolsters 560 and 570. As described above for actuation of the lumbar support, alternatively, a sleeve end may be engaged with seat bottom frame 505, and a wire end may be engaged with seat back frame 510. This alternative configuration also has the sleeve end and wire end separated when the seat is folded up, and a movement of seat back frame 510 from the stowed position applies traction to the traction cable such that the traction cable moves the bolsters 560 and 570.

The Bowden traction cable actuates head rest 660. Actuation of head rest 660 to move it into its supporting position is achieved by connecting the traction cable 630 to the cable tension unit in the same manner as described above for actuation of the lumbar support. The head rest is capable of adjusting its height upwards and downwards. A fixed portion of the head rest 662 is attached to seat back frame 610 and a moving portion of the head rest 664 moves upon actuation to support the head of a seat occupant, in accordance with known bolster movement apparatuses. The Bowden traction cable 630 has a sleeve 632 and a wire 634, each being respectively engaged with the fixed portion 662 and moving portion 664 of the head rest 660 in order to move the moving portion 664 when traction is applied, again according to the techniques described above for actuation of the lumbar support. The moving portion 664 of the head rest 660 moves to support the back of the seat occupant's head upon actuation. In this manner, the head support is automatically actuated when seat back frame 610 is folded up into a position for seating.

A Head Support Embodiment

FIG. 17 is an isometric view of the automatic head support for a fold down seat of the present invention. A preferred embodiment incorporates a head rest 660 that pivots around a horizontal member of a seat back frame 510. As described in the lumbar support embodiments, seat back frame 510 and the torsion bar are cooperatively mounted. Seat back frame 510 is hingedly connected to a seat bottom frame 505 at connection 512. Torsion bar is mounted to and engaged with the overall seat frame in a manner substantially equivalent to that depicted in FIG. 1. A cable tension unit (not shown) is operatively engaged with torsion bar in order to automatically actuate Bowden traction cable 630, also in the manner previously described.

The Bowden traction cable actuates head rest 660. Actuation of head rest 660 to move it into its supporting position is achieved by connecting the traction cable 630 to the cable tension unit in the same manner as described above for actuation of the lumbar support. The head rest is capable of adjusting its height upwards and downwards. A fixed portion of the head rest 662 is attached to seat back frame 610 and a moving portion of the head rest 664 rotates forwards and backwards upon actuation to support the head of a seat occupant, in accordance with known bolster movement apparatuses. The Bowden traction cable 630 has a sleeve 632 and a wire 634, each being respectively engaged with the fixed portion 662 and moving portion 664 of the head rest 660 in order to move the moving portion 664 when traction is applied, again according to the techniques described above for actuation of the lumbar support. The moving portion 664 of the head rest 660 moves forwards and towards the back of the seat occupant's head upon actuation. In this manner, the head support is automatically actuated when seat back frame 610 is folded up into a position for seating.

Arm Rest Embodiment

The self presenting techniques of the present invention may be applied to self presenting arm rests as well. Arm rest 600 may be hingedly engaged with seat back frame 510 and actuated by a Bowden cable in the manner previously described for actuation of Bowden cables applying self presenting traction to the other ergonomic supports herein described.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A fold down seat having an automatically actuating ergonomic support system comprising:
   a seat bottom frame:
   a seat back frame, operatively engaged with said seat bottom frame, said seat back frame being movable between a stowed position and an open position;
   at least one ergonomic support mounted on one of said seat bottom frame or said seat back frame, said ergonomic support having a flat position and at least one extended position; and
   at least one traction cable having a sleeve and a wire disposed to slide axially through said sleeve, a first sleeve end and a first wire end being engaged with said at least one ergonomic support, a second sleeve end being engaged with one of said seat bottom frame or said seat back frame, and a second wire end being engaged with the other of said seat bottom frame or said seat back frame;
   whereby movement of said seat back frame from said stowed position applies traction to said traction cable such that said traction cable moves said ergonomic support from said retracted position.

2. The fold down seat having an automatically actuating ergonomic support system of claim 1 further comprising:
   a seat bottom base;
   at least one support member in elevating linkage with said seat bottom base and said seat bottom frame, said at least one support member mediating travel of said seat bottom frame between a flat position and an elevated position;
   said second sleeve end being engaged with one of said seat bottom base or said seat bottom frame, and said second wire end being engaged with the other of said seat bottom base or said seat bottom frame;
   whereby movement of seat bottom frame from said flat position applies traction to said traction cable such that said traction cable moves said ergonomic support from said retracted position.

3. The fold down seat having an automatically actuating ergonomic support system of claim 2 wherein said support member is comprised of at least two pivoting legs, each of said legs being hingedly connected to each of said seat bottom base and said seat bottom frame.

4. The fold down seat having an automatically actuating ergonomic support system of claim 1, wherein said ergonomic support includes any one of a lumbar support, a thigh support, a lateral bolster and a head support.

5. The fold down seat having an automatically actuating ergonomic support system of claim 4, wherein said lumbar support is an archable pressure surface.

6. The fold down seat having an automatically actuating ergonomic support system of claim 4, further comprising an archable pressure surface in addition to said at least two bolsters.

7. The fold down seat having an automatically actuating ergonomic support system of claim 4, wherein said lumbar support is a scissors lumbar support.

8. The fold down seat having an automatically actuating ergonomic support system of claim 4, wherein said thigh support is any one of at least one front thigh bolster and at least two side thigh bolsters.

9. The fold down seat having an automatically actuating ergonomic support system of claim 8, wherein said at least one front thigh bolster pivots upon extension around a front member of said seat bottom frame.

10. The fold down seat having an automatically actuating ergonomic support system of claim 8, wherein said at least two side thigh bolsters pivot upon extension around two side members of said seat bottom frame.

11. The fold down seat having an automatically actuating ergonomic support system of claim 1, wherein said flat position and said extended position respectively correspond with the stowed position and the open position of the seat, and wherein said extended position has a greater depth of space than said flat position.

12. The fold down seat having an automatically actuating ergonomic support system of claim 1, wherein said ergonomic support is comprised of at least two bolsters and wherein said at least two bolsters pivot upon extension around at least one vertical member of said seat back frame.

13. The fold down seat having an automatically actuating ergonomic support system of claim 12, further comprising lateral wires attached to each of said at least two bolsters.

14. The fold down seat having an automatically actuating ergonomic support system of claim 13, further comprising a flexible wire array mountable on said seat back frame.

15. The fold down seat having an automatically actuating ergonomic support system of claim 14, wherein said lateral wires are operatively engaged with said flexible wire array such that upon said extension of said bolsters, a portion of said flexible wire array is extended.

16. The fold down seat having an automatically actuating ergonomic support system of claim 15, wherein said portion of said flexible wire array substantially corresponds to the lumbar spine of a seat occupant.

17. The fold down seat having an automatically actuating ergonomic support system of claim 15, wherein said flexible wire array is disposed between said lateral wires and a seat occupant.

18. An automatically actuating ergonomic support system for a fold down seat comprising:
   at least one ergonomic support adapted to mount on one of a seat bottom frame or a seat back frame, said ergonomic support having a flat position and at least one extended position; and
   a traction cable having a sleeve and a wire disposed to slide axially through said sleeve, a first sleeve end and a first wire end being engaged with said ergonomic support, a second sleeve end being adapted to engage one of said seat bottom frame or said seat back frame, and a second wire end being adapted to engaged the other of said seat bottom frame or said seat back frame;
   whereby movement of said seat back frame from a stowed position applies traction to said traction cable such that said traction cable moves said ergonomic support from said flat position.

19. The automatically actuating ergonomic support system for a fold down seat of claim 18, wherein said second sleeve end is attached to a pulley housing, said pulley housing being adapted to engage one of said seat bottom frame or said seat back frame, and said second wire end is attached to a pulley, said pulley operatively mounted in said pulley housing and said pulley being adapted to engage the other of said seat bottom frame or said seat back frame, whereby movement of said seat back frame from said stowed position applies traction to said traction cable such that said traction cable moves said ergonomic support from said flat position.

20. The automatically actuating ergonomic support system for a fold down seat of claim 18, wherein said ergonomic support includes any one of a lumbar support, a thigh support, and a head support.

21. The automatically actuating ergonomic support system for a fold down seat of claim 20, wherein said thigh support is any one of at least one front thigh bolster and at least two side thigh bolsters.

22. The automatically actuating ergonomic support system for a fold down seat of claim 21, wherein said at least one front thigh bolster pivots upon extension around a front member of said seat bottom frame.

23. The automatically actuating ergonomic support system for a fold down seat of claim 21, wherein said at least two side thigh bolsters pivot upon extension around two side members of said seat bottom frame.

24. The automatically actuating ergonomic support system for a fold down seat of claim 20, wherein said at least one head support pivots upon extension around a horizontal member of said seat back frame.

25. The automatically actuating ergonomic support system for a fold down seat of claim 18, wherein said flat position corresponds with the stowed position of the seat and said extended position corresponds with the open position of the seat, and wherein said extended position has a greater depth of space than said flat position.

26. The automatically actuating ergonomic support system for a fold down seat of claim 25, further comprising lateral wires attached to each of said at least two bolsters.

27. The automatically actuating ergonomic support system for a fold down seat of claim 26, further comprising a flexible wire array mountable on said seat back frame.

28. The automatically actuating ergonomic support system for a fold down seat of claim 27, wherein said lateral wires are operatively engaged with said flexible wire array such that upon said extension of said bolsters, a portion of said flexible wire array is extended.

29. The automatically actuating ergonomic support system for a fold down seat of claim 28, wherein said portion of said flexible wire array substantially corresponds to the lumbar spine of a seat occupant.

30. The automatically actuating ergonomic support system for a fold down seat of claim 28, wherein said flexible wire array is disposed between said lateral wires and a seat occupant.

31. The automatically actuating ergonomic support system for a fold down seat of claim 25, wherein said lumbar support is an archable pressure surface.

32. The automatically actuating ergonomic support system for a fold down seat of claim 25, further comprising an archable pressure surface in addition to said at least two bolsters.

33. The automatically actuating ergonomic support system for a fold down seat of claim 25, wherein said lumbar support is a scissors lumbar support.

34. The automatically actuating ergonomic support system for a fold down seat of claim 18, wherein said lumbar support is comprised of at least two bolsters and wherein said at least two bolsters pivot upon extension around at least one vertical support member of said seat back frame.

35. A method of actuating an ergonomic support in a fold down seat comprising:
   mounting an ergonomic support on one of a seat back frame or a seat bottom frame;
   engaging said ergonomic support with a first end of a traction cable sleeve and a first end of a traction cable wire;

attaching a second end of said traction cable sleeve to one of said seat bottom frame or said seat back frame;

attaching a second end of said traction cable wire to the other of said seat bottom frame or said seat back frame; and moving said seat between a folded position and an unfolded position.

36. The fold down seat ergonomic support of claim 35 further comprising a horizontal backing rod.

37. The fold down seat of claim 35 further comprising an arm rest hingedly attached to said seat back frame and operatively engaged with a second traction cable disposed to automatically present upon said seat back frame being opened.

38. The automatically actuating ergonomic support of claim 35, wherein said ergonomic support device comprises a flattened position and an extended position having a greater depth of space than said flattened position, said flattened position and said extended position respectively corresponding with said folded position and said unfolded position of said seat.

39. An automatically actuating ergonomic support for a fold down seat comprising:

ergonomic support means mounted on a seat back or a seat bottom, wherein said ergonomic support means comprise a flattened position and an extended position having a greater depth of space than said flattened position, said flattened position and said extended position respectively corresponding with a folded position and an unfolded position of said seat;

folding means between the seat bottom and the seat back;

actuating means engaged with the ergonomic support means, the seat back and the seat bottom such that unfolding the fold down seat actuates said ergonomic support means, thereby moving said ergonomic support means from said flattened position to said extended position.

* * * * *